(12) United States Patent
Furihata et al.

(10) Patent No.: US 10,509,379 B2
(45) Date of Patent: Dec. 17, 2019

(54) OPERATION SUPPORT APPARATUS, SYSTEM, AND METHOD FOR REDUCTION IN NUMBER OF OPERATION MISTAKES OF AN OPERATOR ACTUALLY PERFORMING OPERATIONS IN A FACILITY OF A PLANT

(71) Applicant: Yokogawa Electric Corporation, Tokyo (JP)

(72) Inventors: Ryouhei Furihata, Tokyo (JP); Yusuke Yokota, Tokyo (JP); Toshihiro Itou, Tokyo (JP); Yoshio Uomori, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 50 days.

(21) Appl. No.: 15/844,873

(22) Filed: Dec. 18, 2017

(65) Prior Publication Data

US 2018/0173177 A1   Jun. 21, 2018

(30) Foreign Application Priority Data

Dec. 20, 2016   (JP) .................................. 2016-247155

(51) Int. Cl.
| | | |
|---|---|---|
| G05B 15/00 | (2006.01) | |
| G05B 15/02 | (2006.01) | |
| G06F 3/048 | (2013.01) | |
| G05B 19/418 | (2006.01) | |

(52) U.S. Cl.
CPC ......... *G05B 15/02* (2013.01); *G05B 19/4185* (2013.01); *G05B 19/41835* (2013.01); *G06F 3/048* (2013.01)

(58) Field of Classification Search
CPC .................................................. G05B 15/02

USPC ........................................................... 700/83
See application file for complete search history.

(56) References Cited

U.S. PATENT DOCUMENTS

| 5,315,502 A * | 5/1994 | Koyama ............ G05B 23/0229 700/79 |
| 5,598,572 A * | 1/1997 | Tanikoshi ............ G05B 19/042 712/30 |
| 7,640,007 B2 * | 12/2009 | Chen .................. G05B 19/0423 340/10.1 |
| 7,926,718 B2 * | 4/2011 | Miyashita .............. G06Q 10/06 235/435 |
| 9,043,235 B1 | 5/2015 | Sacks et al. |

(Continued)

FOREIGN PATENT DOCUMENTS

| EP | 2876059 A1 | 5/2015 |
| JP | 11079663 A * | 3/1999 |

(Continued)

OTHER PUBLICATIONS

Sadakata et al, English translation of JP2002189513A, 2002, Patent Translate Powered by EPO and Google, pp. 22 (Year: 2002).*

*Primary Examiner* — Suresh Suryawanshi
(74) *Attorney, Agent, or Firm* — Sughrue Mion, PLLC

(57) ABSTRACT

An operation support apparatus includes an operation control device controlling a target operation performed for a target facility on the basis of operation control information, which indicates each performed operation, including information of the target facility representing a facility that is a target for performing an operation and information of the target operation indicating contents of the operation performed for the target facility.

19 Claims, 7 Drawing Sheets

(56) References Cited

U.S. PATENT DOCUMENTS

| | | | |
|---|---|---|---|
| 9,202,599 B2 * | 12/2015 | Yokoyama | G21D 3/008 |
| 9,244,652 B1 | 1/2016 | Ellis et al. | |
| 2003/0140021 A1 | 7/2003 | Ryan et al. | |
| 2009/0192659 A1 | 7/2009 | Beebe et al. | |
| 2013/0083694 A1 * | 4/2013 | Jinguu | G05B 19/0421 |
| | | | 370/254 |
| 2014/0195290 A1 | 7/2014 | Plost et al. | |
| 2015/0222674 A1 * | 8/2015 | Jinguu | G06F 16/22 |
| | | | 709/204 |
| 2015/0339635 A1 * | 11/2015 | Washiro | G06Q 10/20 |
| | | | 705/305 |
| 2015/0347726 A1 * | 12/2015 | Tokaji | G06F 21/31 |
| | | | 726/18 |
| 2016/0247332 A1 * | 8/2016 | Egawa | G07C 5/0808 |
| 2017/0090466 A1 * | 3/2017 | Uomori | G05B 19/41875 |

FOREIGN PATENT DOCUMENTS

| | | | | |
|---|---|---|---|---|
| JP | 2002189513 | A | * | 7/2002 |
| JP | 2002-244721 | A | | 8/2002 |
| JP | 2003058684 | A | * | 2/2003 |
| JP | 2004-126754 | A | | 4/2004 |
| JP | 200699235 | A | | 4/2006 |
| JP | 2009-32206 | A | | 2/2009 |
| JP | 2011-60089 | A | | 3/2011 |
| JP | 2013-535740 | A | | 9/2013 |
| JP | 2013242774 | A | | 12/2013 |
| JP | 5472145 | B2 | | 4/2014 |
| JP | 2014-81708 | A | | 5/2014 |
| JP | 2015064787 | A | * | 4/2015 |
| JP | 2016133900 | A | * | 7/2016 |
| JP | 2016184303 | A | | 10/2016 |
| WO | 2012/016004 | A2 | | 2/2012 |
| WO | 2016174547 | A1 | | 11/2016 |

* cited by examiner

- OPERATOR
  OPERATOR A

- OPERATION INFORMATION AUTHENTICATION METHOD
  NONE

- REGISTRATION AUTHENTICATION METHOD
  PASSWORD AUTHENTICATION (PASSWORD: XXXX)

- TARGET FACILITY
  TAG: PT100 (MODEL: EJX110)

- TARGET OPERATION
  ZERO-POINT ADJUSTMENT

- REPORTING ITEM
  PARAMETER ACQUIRED BEFORE OPERATION:
    PV(MEASUREMENT VALUE),PLTP(SET VALUE),AO(OUTPUT VALUE)
  PARAMETER ACQUIRED AFTER OPERATION:
    PV(MEASUREMENT VALUE),PLTP(SET VALUE),AO(OUTPUT VALUE)

OPERATION REPORT

| FACILITY | PT100 (EJX110) | PERSON IN CHARGE | STAFF |
|---|---|---|---|
| OPERATION | ZERO-POINT ADJUSTMENT | | STAFF A |
| OPERATION DATE | YYYY/MM/DD HH:MM | | |

PARAMETER ACQUIRED BEFORE OPERATION

| | |
|---|---|
| PRESSURE VALUE PV (MEASUREMENT VALUE) | 0.5kPa |
| PRESSURE-SETTING VALUE PLTP (SET VALUE) | 0.0kPa |
| OUTPUT CURRENT AO (OUTPUT VALUE) | 4.1mA |

PARAMETER ACQUIRED AFTER OPERATION

| | |
|---|---|
| PRESSURE VALUE PV (MEASUREMENT VALUE) | 0.0kPa |
| PRESSURE-SETTING VALUE PLTP (SET VALUE) | -0.5kPa |
| OUTPUT CURRENT AO (OUTPUT VALUE) | 4.0mA |

· OPERATOR
  OPERATOR A

· TARGET FACILITY
  TAG: PT100 (MODEL: EJX110)

· TARGET OPERATION
  LOOP TEST
  OUTPUT SIDE
  START SIGNAL(%):70-30-50
  TEST PATTERN(%):0-50-100-50-0, 10 SECONDS INTERVAL

· REPORTING ITEM
  NONE
```
~WI-1

```
· ID
  2100-2

· OPERATOR
  OPERATOR A

· TARGET FACILITY
  TAG: PT100 (MODEL: EJX110)

· TARGET OPERATION
  LOOP TEST
  INPUT SIDE
  START SIGNAL(%):70-30-50
  TEST PATTERN(%):0-50-100-50-0, 10 SECONDS INTERVAL
  DETERMINATION CRITERION:ERROR±0.3%

· REPORTING ITEM
  DETERMINATION RESULT: SUCCESS/FAILURE
  MEASUREMENT VALUE
```
~WI-2

FIG. 8

```
                        OPERATION REPORT

┌──────────┬──────────────────────────────┐  ┌──────────┬───────┐
  │ FACILITY │ PT100                        │  │ PERSON   │ STAFF │
  │          │ (EJX110)                     │  │ IN CHARGE│       │
  ├──────────┼──────────────────────────────┤  │          │ STAFF │
  │OPERATION │ LOOP TEST                    │  │          │   A   │
  ├──────────┼──────────────────────────────┤  └──────────┴───────┘
  │OPERATION │ YYYY/MM/DD HH:MM             │
  │  DATE    │                              │
  └──────────┴──────────────────────────────┘
```

| RESULT | SUCCESS |
|---|---|
| TEST PATTERN(%) | 0-50-100-50-0 |
| OUTPUT INTERVAL | 10 SECONDS |

| FACILITY OUTPUT RATE | 0% | 50% | 100% | 50% | 0% |
|---|---|---|---|---|---|
| MEASUREMENT VALUE | 0kPa | 49.9kPa | 99.9kPa | 49.9kPa | 0kPa |

R

OPERATION SUPPORT APPARATUS, SYSTEM, AND METHOD FOR REDUCTION IN NUMBER OF OPERATION MISTAKES OF AN OPERATOR ACTUALLY PERFORMING OPERATIONS IN A FACILITY OF A PLANT

BACKGROUND

Technical Field

The present invention generally relates to an operation support apparatus, an operation support system, an operation support method, a program, and a storage medium.

Related Art

In a plant having various facilities, routine operations and operations corresponding to problems such as a malfunction or a defect are performed for each facility located at a specific place inside the plant. Such an operation, for example, may be requested by a manager managing the operation (running) of each facility located in the plant for an operator performing actual operations for each facility located in the plant. The operator visits the facility that is an operation target requested by the manager and performs a requested operation by using various tools and devices. Then, the operator reports results of the performed operation to the manager.

However, in a plant in which a manager requests an operation, and an operator performs an actual operation, a case may be conceived in which the delivery of operation details to the operator is inadequate, or the operator has inadequate understanding of the operation details, and thus, various problems such as operation mistakes and the like occur. For example, in a case in which the details of an operation requested by a manager are inadequately delivered to an operator (in other words, in a case in which the delivery of operation details to the operator is inadequate) or the like, it may be conceived that a facility that is an operation target or operation details are incorrectly acquired. In addition, for example, in a case in which the operator's understanding of the requested operation details is inadequate, it may be conceived that time will be taken for linking the requested operation details and an operation to be actually performed, or an incorrect operation is performed. Furthermore, for example, in a case in which an operator does not adequately understand methods of using tools and devices, it may be conceived that a tool or a device is erroneously operated in a case in which an operation is performed. In addition, for example, in a case in which an operator does not understand the details of an operation to be reported, a mistake may occur in results or records described in the report, or time may be taken for generating a report.

As a factor causing the occurrence of such problems, the skill level of an operator may be conceived. In a plant, it is preferable for operations always to be performed to stable standards regardless of the skill level of an operator.

Thus, in order to manage operations and results of the operations in such a plant, for example, management system technology as disclosed in Patent Document 1 has been proposed. In the technology disclosed in Japanese Patent No. 5472145, an operator performing an operation can be understood, and operations to be performed and deliverables to be generated are notified to each operator. In this way, in the technology disclosed in Patent Document 1, when operations to be performed by an operator and deliverables to be generated are managed more appropriately, effective use of the deliverables generated by the operator can be achieved afterwards.

SUMMARY

However, in the technology disclosed in Japanese Patent No. 5472145, although a problem occurring due to inadequate delivery of the operation details to the operator may be considered to have been solved, by notifying the details of an operation to be performed to an operator, a reduction in the number of operation mistakes of the operator actually performing the operations in the plant is not considered.

In addition, in the technology disclosed in Japanese Patent No. 5472145, although a report in which results of operations performed by an operator are compiled may considered to be able to be acquired by a manager, due to having notified deliverables to be generated to the operator, a report in which information required by the manager is compiled may not always be able to be generated.

An objective of the present invention is to provide an operation support apparatus, an operation support system, an operation support method, a program, and a storage medium supporting operations such that an operation to be performed for each facility installed inside a plant is accurately performed, and an accurate report is generated.

In some aspects of the present invention, an operation support apparatus may include an operation support apparatus supporting an operation performed for each installed facility and includes an operation control device controlling a target operation performed for a target facility on the basis of operation control information, which indicates each performed operation, including information of the target facility indicating a facility that is a target for performing an operation and information of the target operation, hereinafter referred to as target operation information related to the target operation, indicating contents of the operation performed for the target facility.

In addition, the operation support apparatus further includes an operation execution apparatus having an operation function of controlling an operation of the target facility, and the operation control device operates the operation function used when the target operation is performed for the target facility.

Furthermore, the operation control device of the operation support apparatus according to the present invention operates only the operation functions that are necessary for performing the target operation for the target facility.

In addition, in the operation support apparatus, the operation control information further includes a reporting item representing details reported as results of the performed operation, and the operation control device operates the operation function used for acquiring information of operation results represented in the reporting item, acquires information of results of the performed target operation acquired by controlling an operation of the target facility by using the operation execution apparatus, and collectively outputs the acquired information of the results on the basis of the reporting item.

Furthermore, the operation execution apparatus of the operation support apparatus according to the present invention has an operation function for performing a maintenance operation for an installed target facility.

In addition, the operation execution apparatus of the operation support apparatus according to the present invention has an operation function for performing a monitoring operation monitoring an operation state of an installed target facility.

Furthermore, an operation support system supports an operation performed for each installed facility and includes an operation control device controlling a target operation performed for a target facility on the basis of operation control information, which indicates each performed operation, including information of the target facility representing a facility that is a target for performing an operation and information of the target operation, hereinafter referred to as target operation information related to the target operation, representing contents of the operation performed for the target facility.

In addition, the operation control device of the operation support system performs an operation function of an operation execution apparatus having an operation function used when the target operation is performed for the target facility on the basis of each of a plurality of pieces of operation control information in cooperation with each other for an operation.

Furthermore, the operation control device of the operation support system links operations of the operation functions of the operation execution apparatuses corresponding to the target facility such that target operations for the target facility are performed in cooperation with each other on the basis of the pieces of operation control information linked with each other for an operation.

In addition, an operation support method for supporting an operation performed for each installed facility includes controlling a target operation performed for a target facility on the basis of operation control information, which indicates each performed operation, including information of the target facility representing a facility that is a target for performing an operation and information of the target operation, hereinafter referred to as target operation information, representing contents of the operation performed for the target facility.

Furthermore, a program is provided causing a computer of an operation support apparatus that supports an operation performed for each installed facility to execute: controlling a target operation performed for a target facility on the basis of operation control information, which indicates each performed operation, including information of the target facility representing a facility that is a target for performing an operation and information of the target operation, hereinafter referred to as target operation information, representing contents of the operation performed for the target facility.

In addition, a computer-readable storage medium is provided having a program recorded thereon which causes a computer of an operation support apparatus that supports an operation performed for each installed facility to execute: controlling a target operation performed for a target facility on the basis of operation control information, which indicates each performed operation, including information of the target facility representing a facility that is a target for performing an operation and information of the target operation, hereinafter referred to as target operation information related to the target operation, representing contents of the operation performed for the target facility.

The operation support apparatus, the operation support system, the operation support method, the program, and the storage medium can support highly correct or accurate operations to each facility and prepare highly accurate reports of the operations.

BRIEF DESCRIPTION OF THE DRAWINGS

FIG. 3 is an example of operation control information used for requesting an operation in the operation support system according to the first embodiment;

FIG. 4 is a diagram illustrating an example of a report used for reporting results of an operation performed using the operation support system according to the first embodiment;

FIG. 7 shows examples of operation control information used for requesting an operation in the operation support system according to the second embodiment; and FIG. 8 is a diagram illustrating an example of a report used for reporting results of an operation performed using the operation support system according to the second embodiment.

DETAILED DESCRIPTION OF THE INVENTION

First Embodiment

Figure 1:
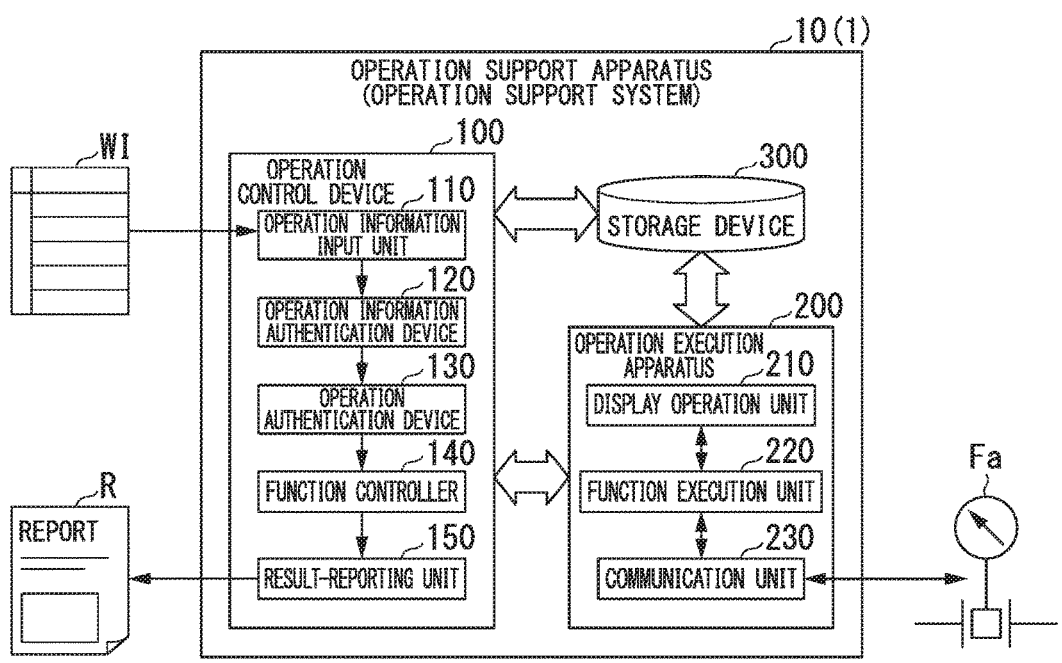
FIG. 1 is a block diagram illustrating a schematic configuration of an operation support system according to a first embodiment of the present invention.

Hereinafter, an embodiment of the present invention will be described with reference to the drawings. FIG. 1 is a block diagram illustrating a schematic configuration of an operation support system 1 according to a first embodiment of the present invention. The operation support system 1 is configured to include an operation control device 100 and an operation execution apparatus 200. In addition, the operation support system 1 may be configured to additionally include a storage device 300. The operation support system 1 is a system supporting an operation of an operator performing a maintenance operation and troubleshooting in a facility installed inside a plant.

The constituent elements (the operation control device 100, the operation execution apparatus 200, and the storage device 300) configuring the operation support system 1 may be either configured as mutually different apparatuses or constituents in the same apparatus. FIG. 1 illustrates a case in which the constituent elements configuring the operation support system 1 are constituents in the same apparatus that is an operation support apparatus 10. More specifically, FIG. 1 illustrates a case in which the operation support system 1 is configured as the operation support apparatus 10 including the operation control device 100, the operation execution apparatus 200, and the storage device 300.

FIG. 1, as an example, illustrates a facility Fa that is a target (operation target) for which an operator performs a maintenance operation or troubleshooting in a plant, operation control information WI input to the operation support apparatus 10 for controlling an operation performed for the facility Fa, and a report R that is output by the operation support apparatus 10 collecting results of an operation performed for the facility Fa together. Here, the operation control information WI, as illustrated in FIG. 1, may be either in the form of being input from outside of the operation support apparatus 10 or in the form of being built into the operation support apparatus 10. In a case in which the operation control information WI is in the form of being built into the operation support apparatus 10, a form may be conceived in which the operation control information WI, for example, is stored in the storage device 300 in advance, and the operation control device 100 reads the operation control information WI from the storage device 300, whereby the operation control information WI is taken (input) into the operation support apparatus 10. On the other hand, in a case in which the operation control information WI is in the form of being input from outside of the operation support apparatus 10, a form may be conceived in which the operation control information WI, for example, is stored in an external storage device such as a storage device on the Internet in a cloud computing system in advance, and the operation control device 100 reads the operation control information WI from the external storage device 300, whereby the operation control information WI is taken (input) into the operation support apparatus 10. In the following description, the operation support system 1 configured as the operation support apparatus 10 will be described. In addition, in the description presented below, a case will be described in which the operation control information WI is in the form of being input from outside of the operation support apparatus 10.

The operation support apparatus 10 is a mobile terminal apparatus that supports an operation of an operator performing a maintenance operation and troubleshooting of facilities installed inside the plant. In the plant, for example, in a case in which a request for an operation for a facility Fa is received from a manager managing the operation (running) of each facility installed in the plant, the operator visits the place of the facility Fa installed inside the plant while carrying the operation support apparatus 10 and performs a maintenance operation or a troubleshooting operation for the facility Fa. As the plant, in addition to an industrial plant performing petroleum refining or production of chemical products, a plant that manages and controls a well site of a gas field, an oil field, or the like and the surroundings thereof, a plant that manages and controls hydroelectric power generation, thermal power generation, and nuclear power generation, or the like, a plant that manages and controls environmental power generation such as solar power generation and wind power generation, or the like, and a plant that manages and controls water supply and sewerage, a dam, or the like are included.

The operation support apparatus 10 may be a mobile terminal apparatus that is exclusively used inside the plant. Furthermore, the operation support apparatus 10, for example, may be a personal computer (PC) or a mobile terminal apparatus such as a tablet terminal having a function of a personal digital assistant (PDA). In addition, the operation support apparatus 10 may be a mobile communication terminal device such as a smartphone in which the function of a mobile telephone using an existing mobile communication network and the function of a PDA are combined. Furthermore, the operation support apparatus 10, for example, may be a terminal device such as a wearable terminal worn by an operator on the body. In the description presented below, the operation support apparatus 10 will be described as being configured as a mobile communication terminal device.

Generally, a plurality of operators belong to a plant. For this reason, a plurality of operation support apparatuses 10 are assumed to be present in a plant. Each of the operators carries the operation support apparatus 10, visits a place of a facility Fa that is an operation target, and performs an operation. However, a case may be conceived in which the operation support apparatus 10 is shared by the operators, in other words, operation support apparatuses 10 dedicated for use for one operator are not provided in the plant. In the description presented below, the operation support apparatus 10 will be described as being shared by a plurality of operators.

The operation control device 100 controls a function executed when an operation is performed using the operation execution apparatus 200 on the basis of the input operation control information WI. The operation control device 100 generates a report R in which results acquired by executing the function for allowing the operation execution apparatus 200 to perform an operation are compiled and outputs the generated report R, for example, to a manager. The operation control device 100 is configured to include an operation information input unit 110, an operation information authentication device 120, an operation authentication device 130, a function controller 140, and a results reporting unit 150.

The operation information input unit 110 receives input of the operation control information WI including information used for controlling an operation performed for the facility Fa. As a method of inputting the operation control information WI to the operation information input unit 110, any one of various methods may be considered. For example, the operation information input unit 110 may be configured to receive the operation control information WI transmitted through a radio communication network constructed inside the plant. In such a case, as the radio communication network, for example, a radio communication network compliant with various industrial radio communication standards such as ISA100.11a and Wireless HART (registered trademark) constructed inside the plant may be conceived. In addition, for example, the operation information input unit 110 may be configured to receive the operation control information WI output from a device connected through a general interface. In such a case, for a general interface, for example, radio communication compliant with any one of a wired interface such as Universal Serial Bus (USB; registered trademark), a radio communication standard such as WiFi (registered trademark), a short-range radio communication standard such as Bluetooth (registered trademark), a near-range radio communication standard such as near-field radio communication (NFC), and the like may be considered. In addition, the operation support apparatus 10 (the operation information input unit 110), for example, may be configured to receive the operation control information WI through the Internet from a cloud server apparatus included in a so-called cloud computing system using data stored on the Internet that is a public communication network such as a web service. In this way, in a case in which the operation control information WI is in the form of being input from outside of the operation support apparatus 10, the operation information input unit 110 receives the operation control information WI stored in an external storage device in advance by using various methods. On the other hand, in a case in which the operation control information WI is in the form of being built into the operation support apparatus 10, for example, a method of receiving the operation control information WI by using the operation information input unit 110 reading the operation control information WI stored in the storage device 300 in advance may be conceived.

Here, the operation control information WI input to the operation information input unit 110 will be described. The operation control information WI is information that is generated by a manager when an operation for a facility installed inside a plant is requested for an operator and represents operation details for each one requested operation. The operation control information WI is generated for each one operation included in operation instructions or an operation manual in which operations to be performed for a facility arranged inside a plant are represented. Accordingly, in a case in which a manager requests a series of operations for an operator, the operation control information WI is generated for each operation included in the series of operations. In other words, in a case in which a series of operations are requested for an operator, a plurality of pieces of operation control information WI is generated by a manager. In addition, the operation control information WI may be generated by the manager every time an operation is requested for an operator, or operation control information WI set and generated in advance may be used. Furthermore, the management may be either performed by a person who is a manager or configured to follow a program executed by a computer. In such a case, the computer may compare report details included in the report R of this time with report details of an operation performed by another operator and reflect results of the comparison in the operation control information WI through feedback. In the description presented below, the operation control information WI will be described as being generated every time the manager requests an operation for an operator, for example, by using a personal computer (PC) or the like used for managing the operation (running) of each facility arranged in a plant.

The operation control information WI at least includes "identification information (ID)" used for identifying the operation control information WI, a "target facility" used for recognizing a facility (the facility Fa illustrated in FIG. 1) that is a target (operation target) for which an operation is performed, and a "target operation" representing operation details to be performed for the facility. The "identification information (ID)", for example, is information that is configured as an n-digit (here, n=natural number or positive integer) character string and is exclusively assigned to the operation control information WI. The "target facility", for example, is information that is exclusively assigned to a facility, which is an operation target, such as a "device ID", a "model name", a "serial number", or the like. The "target facility" may be information in which facilities that are a plurality of operation targets are included. The "target operation", for example, is information such as "zero-point adjustment" representing the details of an operation actually performed by an operator for a facility that is an operation target.

In addition, the operation control information WI may include "report items" used for designating details to be reported as a result of a performed operation on the basis of the information of the "target operation", which will hereinafter be referred to as a target operation information related to the target operation. The "report items", for example, may be information designating items (details) required to be reported as a report R such as an "operation time" used for reporting a time for which an operation is performed, an "operation result" used for reporting a result of the operation, a "parameter" used for a comparison between before and after the operation, a "photograph" or an "image" captured using the operation support apparatus 10, a "measurement value" acquired by performing measurement using a sensor included in the operation support apparatus 10, and the like. In addition, the "report items", for example, may include information designating association (linking) of images captured before and after the operation with the report R.

Furthermore, the operation control information WI may include an "operation information authentication method" used for receiving the operation control information WI. The "operation information authentication method", for example, may be information such as "password authentication" or "fingerprint authentication" representing an authentication method that is necessary for receiving the operation control information WI. In addition, the operation control information WI may include a "registration authentication method" used for performing an operation represented in the "target operation". The "registration authentication method", for example, may be information such as "password authentication" or "fingerprint authentication" representing an authentication method that is necessary when operation details represented in the "target operation" are performed for the facility. By performing authentication on the basis of the information of the "operation information authentication method" and the "registration authentication method, in a case in which an operator tries to receive the operation control information WI, for example, through a keyword search or the like, only an appropriate operator receives the operation control information WI. Here, the "operation information authentication method" or the "registration authentication method" may be either the same authentication method or different authentication methods. In this "operation information authentication method" and the "registration authentication method", no authentication method or one or more authentication methods may be represented. For example, in a case in which the operation information input unit 110 receives the operation control information WI through a one-to-one connection using a wired interface such as USB (registered trademark), there may be no authentication method represented in the "operation information authentication method" and the "registration authentication method". In other words, the operation support apparatus 10 may allow reception of the operation control information WI without performing authentication. The reason for this is that, in a case in which the operation support apparatus 10 directly receives the operation control information WI through a wired interface such as USB (registered trademark), even when authentication according to the "operation information authentication method" or the "registration authentication method" is not performed, it is assumed that an inappropriate operator has not received the operation control information WI, and an operation represented in the "target operation" can be performed. In addition, for example, in a case in which the operation information input unit 110 receives the operation control information WI through a radio communication network built inside the plant, it is preferable that one or a plurality of authentication methods be represented as authentication methods represented in the "operation information authentication method" and the "registration authentication method". In other words, it is preferable that the operation support apparatus 10 receive the operation control information WI by performing authentication. The reason for this is that, since the operation support apparatus 10 is in an environment in which a plurality of pieces of operation control information WI can be received through a radio communication network, by performing authentication according to the "operation information authentication method" and the "registration authentication method", the operation control information WI is received, and it is conceivable that operation support apparatuses 10 that can perform an operation represented in the "target operation" for the facility or operators using the operation support apparatuses 10 can be limited.

In addition, in the operation control information WI, an "operation start condition" used for starting an operation represented in the "target operation" may be included. The "operation start condition", for example, is information representing "operation plan date", a "start time", a "sequence", or the like that represents a condition that is required when operation details represented in the "target operation" are performed for the facility. By using this "operation start condition", an operation represented in the "target operation" included in another piece of operation control information WI that needs to be performed before the execution of an operation represented in the "target operation" and an operation that needs to be performed in a linked manner according to the "target operation" included in a plurality of pieces of operation control information WI may be performed. In addition, by using this "operation start condition", an operation that is regularly performed may be represented by the operation control information WI. Furthermore, the operation support apparatus 10 may have a function for notifying being close to the "operation plan date" or the "start time" to the outside (an operator or the like) when the "operation plan date" or the "start time" is close.

In addition, the operation control information WI may include an "operator" who can perform an operation represented in the "target operation". The "operator", for example, is information used for designating an operator performing an operation on the basis of the degree of difficulty in the operation represented in the "target operation" or the presence/absence of countermeasures that are necessary after the operation. In addition, the "operator" may designate a plurality of operators who can perform an operation represented in the "target operation". By using the information of this "operator", an operator can check whether or not he has received a request for the execution of an operation, and only an appropriate operator receives the operation control information WI. In addition, the operation control information WI may include a "creator". The "creator" is information of a manager who has created the operation control information WI.

The operation information input unit 110 outputs the input (received) operation control information WI to the operation information authentication device 120. In addition, in a case in which a plurality of pieces of operation control information WI are input (received), the operation information input unit 110 may be configured to temporarily store (write) each input (received) piece of operation control information in the storage device 300 and notify the storage of the operation control information WI to the operation information authentication device 120. In such a case, the operation information authentication device 120 is configured to appropriately read the operation control information WI stored in the storage device 300 and perform a process in accordance with a notification from the operation information input unit 110.

The operation information authentication device 120 performs authentication at the time of receiving the operation control information WI by using an authentication method on the basis of the information of the "operation information authentication method" included in the operation control information WI output from the operation information input unit 110. Here, the operation information authentication device 120 determines whether or not an operator using the operation support apparatus 10 is an operator who can receive the operation control information WI. The operation information authentication device 120 has a multi-element authentication function for performing authentication using a plurality of authentication methods. For example, in a case in which "fingerprint authentication" and "password authentication" are represented in the "operation information authentication method", the operation information authentication device 120 determines whether or not the operator is an operator who can receive the operation control information WI by performing authentication using a fingerprint and authentication using a password such as a so-called one-time password. In a case in which the operator is determined to be an operator who can receive the operation control information WI, the operation information authentication device 120 outputs the operation control information WI output from the operation information input unit 110 to the operation authentication device 130. In addition, in a case in which the information of the "operator" is included in the operation control information WI output from the operation information input unit 110, the operation information authentication device 120 may determine whether or not the operator is an operator who can receive the operation control information WI by collating the information (a fingerprint or a one-time password) input by the operator at the time of performing authentication with the information of the "operator".

The operation authentication device 130 performs authentication at the time of performing an operation represented in the "target operation" by using an authentication method on the basis of the information of the "registration authentication method" included in the operation control information WI output from the operation information authentication device 120. Here, the operation authentication device 130 determines whether or not the operator using the operation support apparatus 10 is an operator who can perform the operation represented in the "target operation". The operation authentication device 130 has a multi-element authentication function for performing authentication using a plurality of authentication methods. For example, in a case in which the "fingerprint authentication" and the "password authentication" are represented in the "registration authentication method, the operation authentication device 130 determines whether or not the operator using the operation support apparatus 10 is an operator who can perform the operation represented in the "target operation" by performing authentication using a fingerprint and authentication using a password (one-time password or the like). In a case in which it is determined that the operator is an operator who can perform the operation represented in the "target operation", the operation authentication device 130 outputs the operation control information WI output from the operation information authentication device 120, in other words, the operation control information WI received by the operation information input unit 110 to the function controller 140. In addition, in a case in which the information of the "operator" is included in the operation control information WI output from the operation information authentication device 120, the operation authentication device 130 may determine whether or not the operator is an operator who can perform the operation represented in the "target operation" by collating information (a fingerprint or a one-time password) input by the operator at the time of performing authentication with the information of the "operator". Furthermore, the operation authentication device 130 may determine whether or not the operation support apparatus 10 is an operation support apparatus 10 that can perform the operation represented in the "target operation" on the basis of the information of the "target operation" included in the operation control information WI output from the operation information authentication device 120. In such a case, the operation authentication device 130 determines whether or not a function of being capable of performing the operation represented in the "target operation" is included in the operation execution apparatus 200. Then, in a case in which the operator is an operator who can perform the operation represented in the "target operation", and a function of being capable of performing the operation represented in the "target operation" is included in the operation execution apparatus 200, the operation authentication device 130 determines that the operation requested using the operation control information WI output from the operation information authentication device 120 can be performed.

In addition, the operation authentication device 130 reads information of a tag assigned to the facility, for example, by using a barcode, augmented reality (AR), a radio-frequency identifier (RFID), or the like and compares the read information of the tag with a tag included as information for recognizing a "target facility" in the operation control information WI, thereby performing authentication of the target facility performing an operation represented in the "target operation". Furthermore, this authentication of the target facility may be performed in a state in which communication is not performed by connecting the operation support apparatus 10 to the facility.

In a case in which the authentication method used by the operation authentication device 130 is the same as the authentication method used by the operation information authentication device 120, the operation authentication device 130 may perform authentication by using the information (a fingerprint or a one-time password), which is input by the operator, used for performing authentication when the operation information authentication device 120 performs authentication. In a case in which an operation support apparatus 10 exclusively used for each operator is provided in the plant, the same authentication may be configured to be performed when the operator starts the operation of the operation support apparatus 10. In such a case, each of the operation information authentication device 120 and the operation authentication device 130 may perform authentication by using the information, which is used for performing authentication, input by the operator when the operation support apparatus 10 is started.

The function controller 140 controls the operation of the function included in the operation execution apparatus 200 used for the execution of the operation represented in the "target operation" for a facility (the facility Fa illustrated in FIG. 1) that is an operation target represented in the "target facility" on the basis of the information of the "target facility" and the "target operation" on the basis of the information of the "target facility" and the "target operation" included in the operation control information WI output from the operation authentication device 130. At this time, the function controller 140 may perform control of the operation execution apparatus 200 such that a function that is necessary for performing the operation represented in the "target operation" for the facility that is the operation target operates. In other words, the function controller 140 may perform control such that functions of the operation execution apparatus 200 used for execution of operations other than the operation represented in the "target operation" do not operate for the facility that is the operation target. The function that is necessary for the execution of the operation represented in the "target operation", for example, is determined in advance on the basis of an operation manual representing the sequence of an operation to be performed for the facility or the like. In this way, in the operation support system 1, the function controller 140 can perform control of the operation execution apparatus 200 such that operations other than the operation to be performed are not performed for a facility that is an operation target and facilities that are not the operation target. In addition, in a case in which the "operation start condition" is included in the operation control information WI output from the operation authentication device 130, the function controller 140 performs control of the operation execution apparatus 200 to operate a function for performing the operation represented in the "target operation" at a timing at which a condition represented in the "operation start condition" is satisfied. The function controller 140 outputs information representing a function to be operated to the operation execution apparatus 200. In addition, the function controller 140 outputs the operation control information WI output from the operation authentication device 130, that is, the operation control information WI received by the operation information input unit 110 to the result-reporting unit 150.

Furthermore, in a case in which the information of the "report items" is included in the operation control information WI output from the operation authentication device 130, the function controller 140 operates a function included in the operation execution apparatus 200 on the basis of the information of the "report items" and controls the operation of the function included in the operation execution apparatus 200 used for acquiring information of a result of the execution of the operation represented in the "target operation" for a facility (the facility Fa illustrated in FIG. 1) that is an operation target represented in the "target facility". Then, the function controller 140 acquires information of the result of the execution of the operation represented in the "target operation" from the operation execution apparatus 200. The function controller 140 outputs the information of the result of the execution of the operation acquired from the operation execution apparatus 200 to the result-reporting unit 150.

In addition, in the operation support system 1, in a case in which the operation control device 100 and the operation execution apparatus 200 are configured as different apparatuses, the operation control device 100 (the function controller 140) transmits information representing a function to be operated to the operation execution apparatus 200, for example, through a radio communication network built inside the plant. Furthermore, in a case in which the operation control device 100 is configured inside a cloud server apparatus included in a cloud computing system, the function controller 140 may be configured to transmit the information representing a function to be operated to the operation execution apparatus 200 through the Internet.

The result-reporting unit 150 generates a report R in which the information of results of the execution of the operation output from the function controller 140 is compiled on the basis of the information of the "report items" included in the operation control information WI output from the function controller 140. The result-reporting unit 150 outputs the generated report R to the outside of the operation support apparatus 10. In addition, as a method used by the result-reporting unit 150 for outputting the report R, similar to the case of the operation information input unit 110, various methods may be considered. For example, the result-reporting unit 150 may be configured to transmit the report, for example, to a personal computer (PC) used by a manager for the management of the operation (running) of each facility arranged in the plant through a radio communication network built inside the plant. In addition, for example, the result-reporting unit 150 may be configured to output the report R to a personal computer (PC) used by the manager by using a general interface. Furthermore, the operation support apparatus 10 (the result-reporting unit 150) may be configured to output the report R to a cloud server apparatus included in a cloud computing system through the Internet.

The operation execution apparatus 200 executes functions (hereinafter, referred to as "operation functions") for performing various operations for facilities arranged inside the plant. The operation execution apparatus 200 has operation functions used for controlling all the operations of the facilities and can perform various operations for the facilities by executing the operation functions. The operation execution apparatus 200, for example, may have an operation function of a maintenance tool corresponding to a maintenance operation performed for the facilities arranged inside the plant or the like. However, the operation execution apparatus 200 can not only control the operations of the facilities in an operating state and can execute a corresponding operation function in accordance with input of information, which is output from the operation control device 100, representing a function to be operated. The operation execution apparatus 200 operates only operation functions that are necessary for the execution of an operation represented in the "target operation" included in the operation control information WI among included operation functions in accordance with the information, which is output from the operation control device 100 (more specifically, the function controller 140), representing a function to be operated. In addition, the operation execution apparatus 200 outputs information of a result of the operation acquired from a facility according to the operated operation function to the operation control device 100 (more specifically, the function controller 140) in accordance with the information, which is output from the operation control device 100, representing the function to be operated. The operation execution apparatus 200 is configured to include a display operation unit 210, a function execution unit 220, and a communication unit 230.

The display operation unit 210 is a display unit that presents various kinds of information to an operator carrying the operation support apparatus 10 by generating and displaying a display screen according to data output from the function execution unit 220. In addition, the display operation unit 210 is also an operation unit that receives an operation performed by an operator carrying the operation support apparatus 10 and outputs information of the received operation of the operator to the function execution unit 220. The display operation unit 210, for example, is configured as a touch panel in which a display device such as a liquid crystal display (LCD) and a detection device detecting various touch operations such as a tap or a flick made by an operator, for example, by using a pressure sensor which is included inside the display device are combined.

The function execution unit 220 executes various operation functions that can be executed by the operation support apparatus 10 for a facility (the facility Fa illustrated in FIG. 1). The function execution unit 220 executes an operation function for performing an operation represented in the "target operation" in accordance with the information representing the function to be operated, which is output from the operation control device 100, and outputs a control signal used for controlling the facility Fa according to the executed operation function to the facility Fa through the communication unit 230. In addition, the function execution unit 220 receives various kinds of information output from the facility Fa through the communication unit 230 in accordance with an operation according to an output control signal and outputs the received information to the operation control device 100 (more specifically, the function controller 140) as information of a result of the execution of the operation.

Furthermore, in the operation support system 1, in a case in which the operation control device 100 and the operation execution apparatus 200 are configured as mutually different apparatuses, the operation execution apparatus 200 (the function execution unit 220), for example, transmits information of a result of the execution of the operation to the operation control device 100 through a radio communication network built inside the plant. In addition, in a case in which the operation control device 100 is configured inside a cloud server apparatus included in a cloud computing system, the function execution unit 220 may be configured to transmit the information of a result of the execution of the operation to the operation control device 100 through the Internet.

Furthermore, the function execution unit 220 may be configured to store the information of the result of the operation output from the facility Fa through the communication unit 230 in the storage device 300 once and give a notification of the storage of the result of the operation to the operation control device 100. In such a case, the result-reporting unit 150 included in the operation control device 100 is configured to appropriately read the information of the result of the operation stored in the storage device 300 in accordance with the notification from the function execution unit 220 and generate a report R arranged on the basis of the information of the "report items" included in the operation control information WI.

The communication unit 230 communicates with the facility Fa and transmits a control signal output from the function execution unit 220 to the facility Fa. In addition, the communication unit 230 communicates with the facility Fa, receives various kinds of information output from the facility Fa in accordance with the output control signal, and outputs the received information to the function execution unit 220. For a communication method between the communication unit 230 and the facility Fa, any one of various communication methods may be considered. Thus, in the present invention, the communication method between the communication unit 230 and the facility Fa is not particularly defined regardless of a wired method or a wireless method.

The storage device 300 is a storage device that temporarily stores (maintains) data used for various processes in the operation support apparatus 10. The storage device 300, for example, may be configured as a dynamic random-access storage device (300) (DRAM) or the like. The storage device 300, for example, temporarily stores (maintains) the operation control information WI input to (received by) the operation information input unit 110 included in the operation control device 100. In addition, the storage device 300 temporarily stores (maintains) various kinds of information of the result of the execution of the operation for the facility Fa acquired by the function execution unit 220 included in the operation execution apparatus 200 through the communication unit 230.

Although FIG. 1 illustrates a case in which the storage device 300 is a constituent element included in the operation support apparatus 10, the storage device 300 may be a constituent element provided outside the operation support apparatus 10. In such a case, the storage device 300, for example, temporarily stores (maintains) the operation control information WI and the information of the result of the execution of the operation transmitted from the operation support apparatus 10 through a radio communication network built inside the plant. In addition, the storage device 300 may be a storage device storing data on the Internet used by a cloud server apparatus of a cloud computing system. In such a case, the storage device 300 temporarily stores (maintains) the operation control information WI and the information of the result of the execution of the operation transmitted from the operation support apparatus 10 through the Internet.

By using such a configuration, the operation support apparatus 10 (operation support system 1) supports an operator who visits the place of the facility Fa arranged inside the plant while carrying the operation support apparatus 10 and performs a maintenance operation or a troubleshooting operation requested by the manager. More specifically, the operation support apparatus 10 supports an operation performed by the operator to perform the requested operation for a facility that is an operation target represented in the "target facility" and the "target operation" included in the operation control information WI. Furthermore specifically, the operation support apparatus 10 supports an operation performed by an operator such that other operations for a facility that is an operation target are not performed or other operations for a facility other than the operation target are not performed, in other words, such that an incorrect operation is not performed by causing the operator to perform only a requested operation for the facility that is the operation target represented in the "target facility" and the "target operation" included in the operation control information WI. For example, in the case of zero-point adjustment, the operation control device 100 receives operation control information WI including "zero-point adjustment" as the "target operation" and transmits a control signal used for performing zero-point adjustment in the facility Fa to the operation execution apparatus 200. The operation execution apparatus 200 has an operation function for performing the operation of zero-point adjustment in the facility Fa, receives a control signal transmitted from the operation control device 100, and causes the facility Fa to perform the operation of zero-point adjustment on the basis of the received control signal.

In addition, the operation support apparatus 10 supports an operator performing an operation of generating a report by generating a report in which results of operations represented in the "report items" included in the operation control information WI are arranged. Accordingly, in the operation support apparatus 10 (the operation support system 1), an operator can perform an appropriate operation for a facility that is an operation target, and a manager can acquire and check the report in which results of desired operations are arranged.

Figure 2:
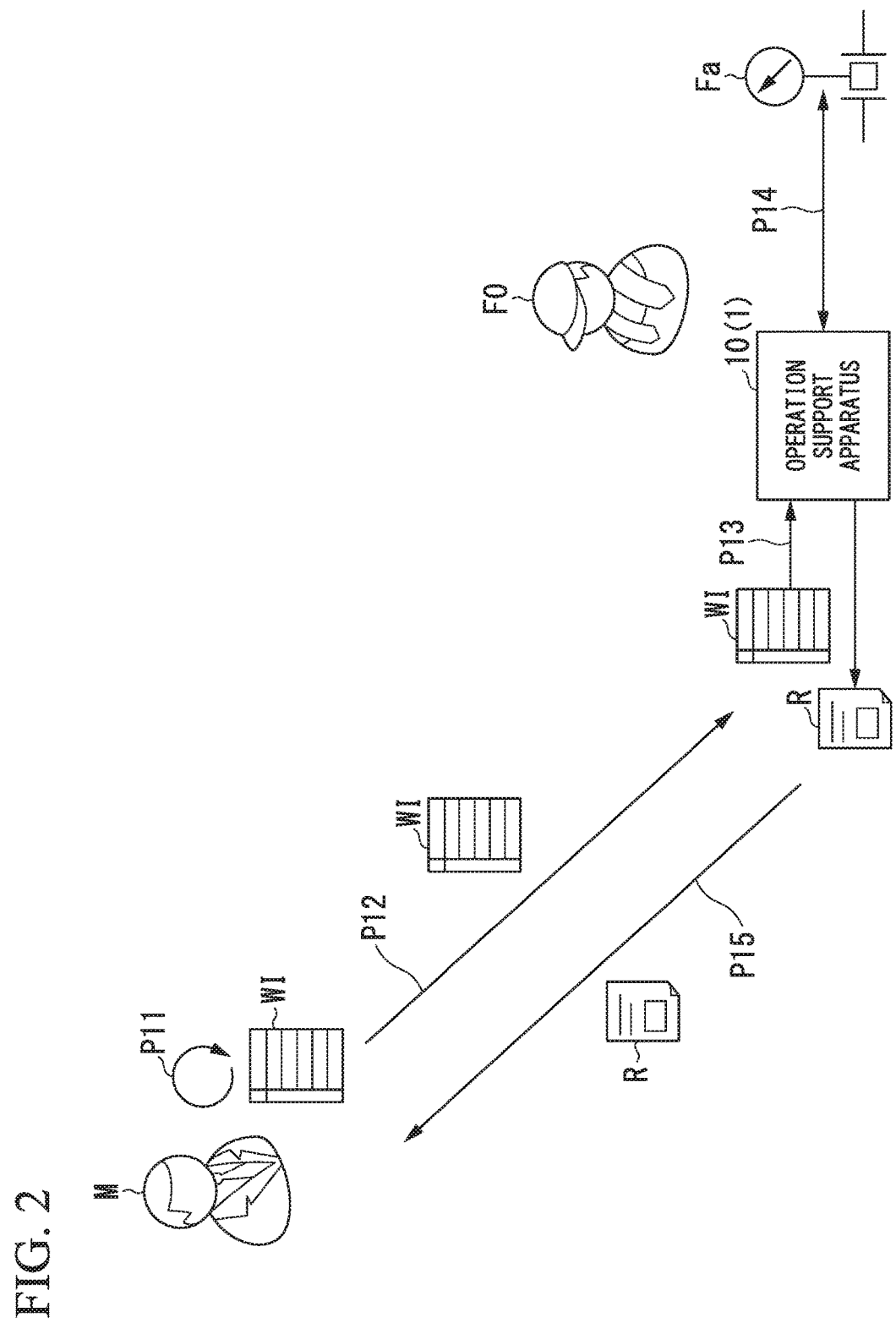
FIG. 2 is an example of a sequence in which an operation is performed using the operation support system according to the first embodiment.

Next, the sequence of an operation in a plant into which the operation support system 1 according to the first embodiment is built will be described. Also in the description presented below, each constituent element configuring the operation support system 1 will be described as being configured inside the operation support apparatus 10. FIG. 2 is an example of a sequence in which an operation is performed using the operation support system 1 (the operation support apparatus 10) according to the first embodiment.

(Process P11): A manager M generates operation control information WI used for requesting an operation for a facility Fa arranged inside a plant for an operator FO by using a personal computer (PC) used by the manager M for managing the operation (running) of each facility arranged in the plant or the like.

Here, an example of the operation control information WI generated by the manager M will be described. FIG. 3 is an example of the operation control information WI used for requesting an operation in the operation support system 1 according to the first embodiment. FIG. 3 illustrates an example of the operation control information WI including information of each of "identification information (ID)", "operator", "operation information authentication method", "registration authentication method", "target facility", "target operation", and "report items". More specifically, in the operation control information WI illustrated in FIG. 3, as information of the "identification information (ID)", "1234" assigned for identifying this operation control information WI is included. In addition, in the operation control information WI illustrated in FIG. 3, as the information of the "operator", "Operator A" that is a staff name of an operator FO requesting an operation is included. In addition, in the operation control information WI illustrated in FIG. 3, as the information of the "operation information authentication method", "None" representing that no authentication is performed at the time of receiving the operation control information WI is included. Furthermore, in the operation control information WI illustrated in FIG. 3, as the information of the "registration authentication method", "password authentication (password: XXXX)" representing that authentication using a password is performed is included. In addition, in the operation control information WI illustrated in FIG. 3, as the information of the "target facility", "Tag: PT100 (model: EJX110)" representing that a facility Fa of which the assigned tag is "PT100" is an operation target facility is included. Furthermore, in the operation control information WI illustrated in FIG. 3, as the information of the "target operation", "zero-point adjustment" representing that an operation of calibrating the zero point of the facility Fa that is an operation target is performed is included. In addition, in the operation control information WI illustrated in FIG. 3, as the information of the "reporting items", "parameters acquired before the operation: PV (measurement value), PLTP (set value), and AO (output value)" and "parameters after the operation: PV (measurement value), PLTP (set value), and AO (output value)" that represent parameters of the measurement values of the pressure value PV, set values of the pressure-setting value PLTP, and output values of an output current AO before and after the operation that need to be reported in a report are included. According to the information as described above, the operation control information WI illustrated in FIG. 3 is used for requesting an operator="Operator A" to perform an operation of "zero-point adjustment" for a facility Fa to which Tag="PT100" is assigned and provide a report in which the pressure values PV, the pressure-setting values PLTP, and the output currents AO before and after the operation are included.

(Process P12): A manager M requests an operation for the operator FO by outputting the generated operation control information WI. Here, as a method for the manager M to request an operation for the operator FO, as described above, any one of various methods may be considered. For example, a method in which the data of the operation control information WI generated from a user personal computer (PC) by the manager M is taken out and transmitted to an operator FO may be used, or a method in which the data of the generated operation control information WI is transmitted to a personal computer (PC) or the operation support apparatus 10 used by the operator FO may be used. In addition, for example, a method may be used in which a request for an operation is transmitted to an operator FO by transmitting the data of the generated operation control information WI to a server apparatus that can be operated by the operator FO through a radio communication network built inside the plant. Furthermore, for example, the data of the generated operation control information WI may be directly transmitted to the operation support apparatus 10 through a radio communication network built inside the plant.

(Process P13): The operator FO inputs the operation control information WI to the operation support apparatus 10 in accordance with a request for an operation from the manager M. Accordingly, each constituent element of the operation support apparatus 10 performs the process described above, receives the input operation control information WI, and is in a state in which an operation function for performing an operation represented in the "target operation" is operated. More specifically, in a case in which an operator FO is authenticated as an operator who can perform an operation represented in the "target operation" by using an authentication method according to the "operation information authentication method" and the "registration authentication method" included in the input operation control information WI, the operation control device 100 receives and registers the operation control information WI. Then, the operation control device 100 performs control of the operation execution apparatus 200 to operate a function that is necessary for the execution of the operation represented in the "target operation" included in the registered operation control information WI. The operation execution apparatus 200 stands by in a state in which the operation function for performing the operation represented in the "target operation" included in the registered operation control information WI is executed in accordance with the control from the operation control device 100.

At this time, the operation support apparatus 10 displays the details of an operation requested by the manager M, which is represented in the operation control information WI, to the operator FO by displaying information included in the registered operation control information WI on the display operation unit 210. Here, the operation support apparatus 10 displays information of at least a facility that is an operation target represented in the "target facility" and operation details to be performed for the facility that is the operation target represented in the "target operation" on the display operation unit 210. Accordingly, an operator FO can check an operation requested to be performed and a facility arranged inside the plant for which the operation is requested. In addition, in a case in which "reporting items" are included in the registered operation control information WI, the operation support apparatus 10 displays information of details to be reported as a result of the operation represented in the "reporting items" on the display operation unit 210. Accordingly, the operator FO can check a result needed to be reported when an operation is performed for a certain facility arranged inside the plant. In addition, in a case in which the "operation start condition" is included in the registered operation control information WI, the operation support apparatus 10 displays a condition represented in the "operation start condition" on the display operation unit 210 as well. Accordingly, the operator FO can check a timing at which the requested operation is performed for a certain facility arranged inside the plant.

(Process P14): The operator FO visits the facility Fa that is the requested operation target on the basis of the information of the facility displayed on the display operation unit 210 and connects the operation support apparatus 10 executing an operation function corresponding to the "target operation" included in the registered operation control information WI to the facility Fa that is the operation target. Accordingly, the operation support apparatus 10 performs an operation represented in the "target operation", in other words, an operation requested for the operator FO from the manager M for the facility Fa by using the executing operation function. At this time, the operator FO, as is necessary, performs an operation of the operation support apparatus 10 according to instructions for the operation displayed on the display operation unit 210. In addition, when the operation is performed for the facility Fa, the operation support apparatus 10 acquires information of details to be reported as a result of the operation represented in the "reporting items" included in the registered operation control information WI from the facility Fa.

(Process P15): When the operation for the facility Fa that is performed by the operation support apparatus 10 ends, the operator FO disconnects the operation support apparatus 10 from the facility Fa and, for example, returns to an office in which the manager M is waiting or in which the operator FO is supposed to wait or the like. At this time, the operation support apparatus 10 generates a report R in which a result of the performed operation is arranged on the basis of information acquired from the facility Fa. Then, the operator FO, for example, at the office, submits the report R generated by the operation support apparatus 10 to the manager M. For a method for submitting the report R to the manager M that is performed by the operator FO, as described above, any one of various methods may be considered. For example, a method in which the data of the report R generated by the operation support apparatus 10 is taken out and is transmitted to the manager M may be used or a method in which the data of the report R that is taken out is transmitted from a server apparatus that can be operated by the operator FO to a personal computer (PC) used by the manager M may be used. In addition, for example, a method may be used in which the data of the report R that has been taken out is transmitted to a server apparatus that can be operated by the manager M through a radio communication network built inside the plant, and the submission of the report is notified to the manager M. Furthermore, for example, the data of the report R generated by the operation support apparatus 10 may be directly transmitted to a personal computer (PC) or a server apparatus used by the manager M through a radio communication network built inside the plant.

Here, an example of the report R generated by the operation support apparatus 10 will be described. FIG. 4 is a diagram illustrating an example of the report R used for reporting a result of an operation performed using the operation support system 1 according to the first embodiment. FIG. 4 illustrates an example of the report R reporting a result of an operation according to the operation control information WI illustrated in FIG. 3. More specifically, an example of the report R used for reporting the pressure values PV (measurement values), the pressure-setting values PLTP (set values), and the output currents AO (output values) before and after the operation represented as the information of the "reporting items" in the operation control information WI illustrated in FIG. 3 is illustrated. In the report R illustrated in FIG. 4, "PT100" represented as the tag of the facility Fa that is an operation target and "EJX110" represented as the model of the facility Fa that is the operation target in the "target facility" of the operation control information WI illustrated in FIG. 3 are represented in the field of "facility". In the report R illustrated in FIG. 4, "zero-point adjustment" represented as the operation details of the "target operation" of the operation control information WI illustrated in FIG. 3 is represented in the field of "operation". In addition, in the report R illustrated in FIG. 4, "date" and "time" when the requested operation for the facility Fa that is the operation target was performed are represented in the field of "operation date". In the report R illustrated in FIG. 4, "Operator A" represented as the staff name requesting the operation in the "operator" of the operation control information WI illustrated in FIG. 3 is represented in the field of "staff". In the report R illustrated in FIG. 4, the field of "staff" is a blank. In addition, in the report R illustrated in FIG. 4, the values of the pressure value PV (measurement value), the pressure-setting value PLTP (set value), and the output current AO (output value) before the operation represented as information needed to be reported in the "reporting items" of the operation control information WI illustrated in FIG. 3 are represented in a field corresponding to parameters acquired before the operation. In the report R illustrated in FIG. 4, the values of the pressure value PV (measurement value), the pressure-setting value PLTP (set value), and the output current AO (output value) after the operation represented as information needed to be reported in the "reporting items" of the operation control information WI illustrated in FIG. 3 are represented in a field corresponding to parameters acquired after the operation. By using the report R as illustrated in FIG. 4, the manager M can check the pressure values PV, the pressure-setting values PLTP, and the output currents AO before and after the operation acquired as a result of the execution of the operation of the "zero-point adjustment" for the facility Fa, to which Tag="PT100" is assigned, requested for operator="Operator A".

According to such a sequence, the operation support apparatus 10 (the operation support system 1) supports an operator FO who visits the place of the facility Fa arranged inside the plant while carrying the operation support apparatus 10 and performs a maintenance operation or a troubleshooting operation requested by the manager M. More specifically, the operation support apparatus 10 executes an operation function performing only a requested operation for the facility Fa that is the operation target represented in the "target facility" and the "target operation" included in the operation control information WI. In addition, the operation support apparatus 10 arranges a result of the operation acquired from the facility Fa that is the operation target as a report R by using the executing operation function. Accordingly, in the operation support apparatus 10 (the operation support system 1), the operator FO can accurately perform the operation requested by the manager M. In addition, in the operation support apparatus 10 (the operation support system 1), results desired to be reported by the manager M that are represented in the "reporting items" included in the operation control information WI can be accurately reported.

As described above, the operation support system 1 according to the first embodiment supports an operator FO who visits the place of the facility Fa arranged inside the plant while carrying the operation support apparatus 10 configured as the operation support system 1 and performs a maintenance operation or a troubleshooting operation requested by the manager M such that an incorrect operation is not performed. Accordingly, in the operation support system 1 according to the first embodiment, the operator FO can perform an appropriate operation for the facility that is the operation target.

In addition, the operation support system 1 according to the first embodiment supports the operator FO generating a report R in which results of operations desired by the manager M are compiled on the basis of the results of the operations performed by the operation support apparatus 10 configured by the operation support system 1. Accordingly, in the operation support system 1 according to the first embodiment, a report R in which results of operations desired by the manager M are written can be generated, and the manager M can acquire and check the report R in which the results of the desired operations are arranged.

In the operation support system 1 according to the first embodiment, a case has been described in which each of the operation control device 100, the operation execution apparatus 200, and the storage device 300 configuring the operation support system 1 is configured as one operation support apparatus 10. However, as described above, a plurality of operators may belong to the plant, and all the operators do not necessarily perform the same operation. For this reason, the operation support apparatus used by each operator belonging to the plant is not necessarily limited to the execution of an operation function such as a maintenance tool performing a maintenance operation for a facility that is arranged inside the plant or the like. Accordingly, a plurality of different operation support systems corresponding to operation support apparatuses performing respective operation functions, in other words, operation support apparatuses present in the plant may be present. For example, an operation support system executing an operation function for monitoring the states of facilities arranged inside the plant may be present. In addition, as described above, as operations performed in the plant, there are also cases where one operation is performed with a plurality of operation functions in cooperation with each other. For this reason, mutually different operation support systems (operation support apparatus) having linked operation functions may be configured as one operation support system.

Second Embodiment

Next, a second embodiment of the present invention will be described. In the second embodiment, a case in which a loop test is performed in a plant will be described. Here, the loop test is a test for checking the integrity of a path from a facility outputting a test signal to a location monitoring the test signal by outputting a test signal from the facility and monitoring the test signal that is transmitted through the path that is a monitoring target.

Figure 5:
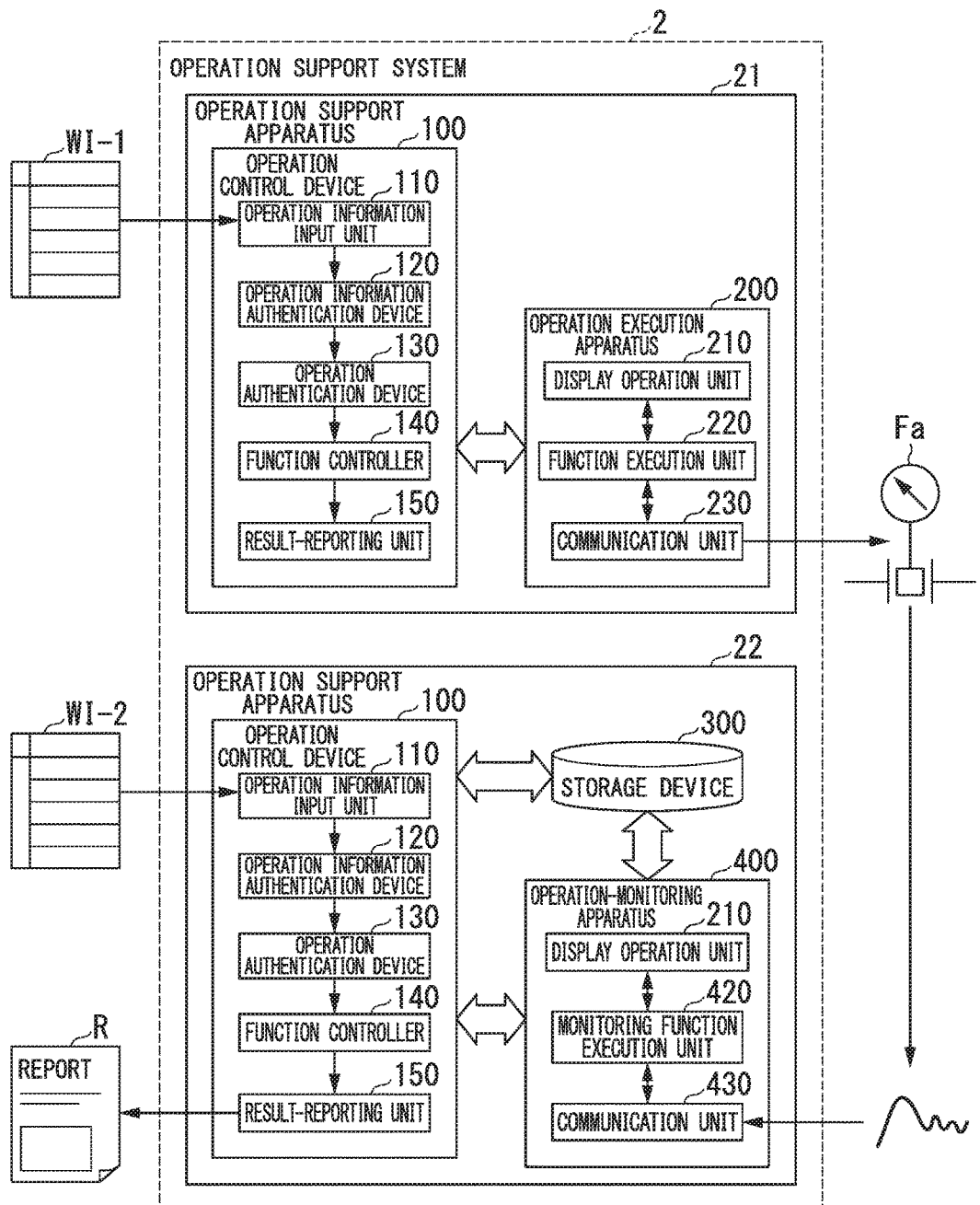
FIG. 5 is a block diagram illustrating a schematic configuration of an operation support system according to a second embodiment of the present invention.

FIG. 5 is a block diagram illustrating a schematic configuration of an operation support system according to the second embodiment of the present invention. The operation support system 2 is configured to include an operation support apparatus 21 and an operation support apparatus 22. The operation support system 2 is a system that supports an operation of an operator who performs a maintenance operation or troubleshooting in a facility installed inside a plant by linking the operation support apparatus 21 and the operation support apparatus 22.

Also in the operation support system 2, similar to the operation support system 1 according to the first embodiment, constituent elements configuring the operation support system 2 may be configured as different apparatuses or be configured inside the same apparatus. FIG. 5 illustrates a case in which constituent elements configuring the operation support system 2 are configured inside two operation support apparatuses that are the operation support apparatuses 21 and 22. More specifically, FIG. 5 illustrates a case in which the operation support system 2 is configured by the operation support apparatus 21 including an operation control device 100 and an operation execution apparatus 200 and the operation support apparatus 22 including an operation control device 100, an operation-monitoring apparatus 400, and a storage device 300.

In addition, in FIG. 5, as an example, a path (hereinafter, referred to as a "monitoring target path") through which a state corresponding to the operation of a facility Fa, which is a target for which an operator performs a maintenance operation or troubleshooting in a plant, is delivered, and operation control information WI-1 that is input to the operation support apparatus 21 for monitoring the monitoring target path, operation control information WI-2 that is input to the operation support apparatus 22, and a report R that is output by the operation support apparatus 22 as a result of the monitoring of the monitoring target path are illustrated together. The operation control information WI-1 and the operation control information WI-2 are operation control information WI in cooperation with each other for executing one operation for a facility arranged inside the plant by linking a plurality of operation functions. In the description presented below, the operation support system 2 configured by the operation support apparatus 21 and the operation support apparatus 22 will be described.

In the operation support apparatus 21 and the operation support apparatus 22 configuring the operation support system 2, constituent elements that are the same as the constituent elements configuring the operation support system 1 according to the first embodiment illustrated in FIG. 1 are included as well. Thus, in the following description, in the operation support system 2 according to the second embodiment, the same reference numerals will be assigned to constituent elements that are the same as constituent elements of the operation support system 1 according to the first embodiment, and detailed description of these constituent elements will be omitted.

Each of the operation support apparatus 21 and the operation support apparatus 22 is a mobile terminal apparatus that supports an operation of an operator performing a maintenance operation and troubleshooting of facilities installed inside the plant in a linked manner. More specifically, when monitoring of a monitoring target path is performed, the operation support apparatus 21 causes the facility Fa to perform an operation set in advance on the basis of the input operation control information WI-1. In addition, when monitoring of a monitoring target path is performed, the operation support apparatus 22 monitors the operation of the facility Fa that has been delivered through the monitoring target path on the basis of the input operation control information WI-2. The operation support apparatus 22 monitors the operation of the facility Fa that has been delivered through the monitoring target path at a location (for example, the location of facilities arranged at an end of the monitoring target path) on the monitoring target path. In this way, the operation support apparatus 22 monitors whether or not the operation of the facility Fa controlled by the operation support apparatus 21 has been correctly delivered to the location on the monitoring target path that is monitored.

Each of the operation support apparatus 21 and the operation support apparatus 22, similar to the operation support system 1 according to the first embodiment, may be a mobile terminal apparatus that is exclusively used inside the plant. In addition, each of the operation support apparatus 21 and the operation support apparatus 22, similar to the operation support system 1 according to the first embodiment, may be a mobile terminal device or a mobile communication terminal device. In the description presented below, each of the operation support apparatus 21 and the operation support apparatus 22, similar to the operation support system 1 according to the first embodiment, will be described as being configured as a mobile communication terminal device.

In the following description, two operators receiving requests from the manager will be described as performing a maintenance operation (hereinafter, referred to as a "monitoring operation") of a monitoring target path, through which the operation of the facility Fa is delivered, in cooperation with each other. In such a case, one operator visits the place of the facility Fa arranged inside the plant while carrying the operation support apparatus 21 and performs an operation set in advance for the facility Fa. In addition, the other one operator visits a location set in advance on a monitoring target path in which the operation of the facility Fa is monitored while carrying the operation support apparatus 22 and monitors the state of the operation, which is set in advance, of the facility Fa. In this way, two operators perform a monitoring operation for the monitoring target path of the facility Fa in cooperation with each other by using the operation support system 2.

Here, the configurations of the operation support apparatus 21 and the operation support apparatus 22 configuring the operation support system 2 will be described.

First, the configuration of the operation support apparatus 21 will be described. The operation support apparatus 21 is configured to include an operation control device 100 and an operation execution apparatus 200. The operation control device 100 is configured to include an operation information input unit 110, the operation information authentication device 120, an operation authentication device 130, a function controller 140, and a result-reporting unit 150. The operation execution apparatus 200 is configured to include a display operation unit 210, a function execution unit 220, and a communication unit 230. The operation support apparatus 21 has a configuration acquired by eliminating the storage device 300 from the operation support apparatus 10 configured as the operation support system 1 according to the first embodiment illustrated in FIG. 1. The other constituent elements included in the operation support apparatus 21 are similar to the constituent elements included in the operation support apparatus 10 configured as the operation support system 1 according to the first embodiment. As described above, the operation support apparatus 21 causes a facility Fa to perform an operation set in advance for monitoring a monitoring target path on the basis of input operation control information WI-1. However, the operation of each constituent element on the basis of the operation control information WI-1 in the operation support apparatus 21 may be considered to be similar to the operation of a corresponding constituent element included in the operation support apparatus 10 configured as the operation support system 1 according to the first embodiment. Thus, detailed description of the constituent elements included in the operation support apparatus 21 will not be presented.

Subsequently, the configuration of the operation support apparatus 22 will be described. The operation support apparatus 22 is configured to include an operation control device 100, an operation-monitoring apparatus 400, and a storage device 300. The operation control device 100 is configured to include an operation information input unit 110, an operation information authentication device 120, an operation authentication device 130, a function controller 140, and a result-reporting unit 150. The operation control device 100 is similar to the operation control device 100 included in the operation support apparatus 10 configured as the operation support system 1 according to the first embodiment illustrated in FIG. 1 and the operation control device 100 included in the operation support apparatus 21. In addition, the storage device 300 is similar to the storage device 300 included in the operation support apparatus 10 configured as the operation support system 1 according to the first embodiment. As described above, the operation support apparatus 22 monitors the operation of a facility Fa delivered through a monitoring target path on the basis of input operation control information WI-2. The operation of each constituent element of the operation support apparatus 22 on the basis of the operation control information WI-2 can be regarded to be similar to the operation of a corresponding constituent element included in the operation support apparatus 10 configured as the operation support system 1 according to the first embodiment. Thus, detailed description of the operation control device 100 and the storage device 300 included in the operation support apparatus 22 will not be presented, and the operation-monitoring apparatus 400 included in the operation support apparatus 22 will be described.

The operation-monitoring apparatus 400 is an operation execution apparatus that is used for executing an operation function (hereinafter, referred to as a "monitoring function") of a monitoring operation for monitoring the operation state of a facility in a monitoring target path arranged inside a plant. In addition, the operation-monitoring apparatus 400 has a function for determining the operation state of a facility monitored according to the executed monitoring function. Similar to the operation execution apparatus 200 included in the operation support apparatus 10 configured as the operation support system 1 according to the first embodiment illustrated in FIG. 1 and the operation execution apparatus 200 included in the operation support apparatus 21, the operation-monitoring apparatus 400 can not only execute the monitoring function in an operated state but can execute a corresponding monitoring function when information representing the monitoring function to be executed, which is output from the operation control device 100, is input. The operation-monitoring apparatus 400 operates only a monitoring function that is necessary for performing an operation (monitoring operation) represented in the "target operation" included in the operation control information WI-2 among monitoring functions included therein in accordance with the information, which is output from the operation control device 100 (more specifically, the function controller 140), representing a monitoring function to be operated. The operation-monitoring apparatus 400 outputs information of a result of the monitoring of the operation state of a facility delivered through a monitoring target path in accordance with the operated monitoring function to the operation control device 100 (more specifically, the function controller 140). The operation-monitoring apparatus 400 is configured to include a display operation unit 210, a monitoring function execution unit 420, and a communication unit 430.

The display operation unit 210 configuring the operation-monitoring apparatus 400 is similar to the operation execution apparatus 200 included in the operation support apparatus 10 configured as the operation support system 1 according to the first embodiment and the display operation unit 210 configuring the operation execution apparatus 200 included in the operation support apparatus 21. Thus, detailed description of the display operation unit 210 included in the operation-monitoring apparatus 400 will not be presented, and the monitoring function execution unit 420 and the communication unit 430 included in the operation-monitoring apparatus 400 will be described.

The monitoring function execution unit 420 executes various monitoring functions used for monitoring the operation state of a facility delivered through a monitoring target path in accordance with the operation of the facility (the facility Fa illustrated in FIG. 5), which is set in advance, according to the control performed by the operation support apparatus 21. The monitoring function execution unit 420 executes a monitoring function for performing a monitoring operation represented in the "target operation" in accordance with information representing a monitoring function to be operated, which is output from the operation control device 100, and outputs a control signal used for monitoring the monitoring target path in accordance with the executed monitoring function to a measuring device, which is not illustrated in the drawings, such as a measuring instrument installed in the monitoring target path through the communication unit 430. In addition, the monitoring function execution unit 420 receives various kinds of information representing the operation state of the facility Fa acquired by the communication unit 430 from the measuring device in accordance with the output control signal and outputs the received information to the operation control device 100 (more specifically, the function controller 140) as information of a result of the execution of the monitoring operation.

In addition, in the operation support system 2, in a case in which the operation control device 100 included in the operation support apparatus 22 and the operation-monitoring apparatus 400 are configured as mutually different apparatuses, the operation-monitoring apparatus 400 (the monitoring function execution unit 420), similar to the operation execution apparatus 200 included in the operation support apparatus 10 configured as the operation support system 1 according to the first embodiment and the operation execution apparatus 200 included in the operation support apparatus 21, for example, transmits the information of the result of the execution of the monitoring operation to the operation control device 100 through a radio communication network built inside the plant. In addition, in a case in which the operation control device 100 is configured inside a cloud server apparatus included in a cloud computing system, similar to the operation execution apparatus 200 included in the operation support apparatus 10 configured as the operation support system 1 according to the first embodiment and the operation execution apparatus 200 included in the operation support apparatus 21, the monitoring function execution unit 420 may be configured to transmit the information of the result of the execution of the monitoring operation to the operation control device 100 through the Internet.

Furthermore, the monitoring function execution unit 420 may be configured to store (write) information representing the operation state of the facility Fa acquired by the communication unit 430 from the measuring device in the storage device 300 once and give a notification of the storage of the operation state to the operation control device 100. In such a case, the result-reporting unit 150 included in the operation control device 100 is configured to appropriately read the information representing the operation state of the facility Fa stored in the storage device 300 in accordance with the notification from the monitoring function execution unit 420 and generate a report R on the basis of information of the "reporting items" included in the operation control information WI-2.

The communication unit 430 communicates with a measuring device, which is not illustrated in the drawings, installed in the monitoring target path and transmits the control signal output from the monitoring function execution unit 420 to the measuring device. In addition, the communication unit 430 communicates with a measuring device that is not illustrated in the drawing, receives various kinds of information output from the measuring device that is not illustrated in the drawing in accordance with the output control signal, and outputs the received information to the monitoring function execution unit 420. As a method for communication between the communication unit 430 and the measuring device that is not illustrated in the drawing, any one of various communication methods may be used. Thus, in the present invention, the method for communication between the communication unit 430 and the measuring device that is not illustrated in the drawing is not particularly defined regardless of a wired communication method or a radio communication method.

By employing such a configuration, the operation support system 2 supports an operator who visits the place of a facility Fa arranged inside a plant while carrying the operation support apparatus 21 and causes the facility Fa to perform an operation set in advance in the monitoring operation requested by the manager. In addition, the operation support system 2 supports an operator who visits a location on a monitoring target path arranged inside a plant while carrying the operation support apparatus 22 and controls a measuring device, which is not illustrated in the drawing, for monitoring the operation state of a facility Fa in a monitoring operation requested by a manager. More specifically, in the operation support system 2, the operation support apparatus 21 is caused to perform only a monitoring operation requested for a monitoring target facility represented in the "target facility" and the "target operation" included in the operation control information WI-1, and the operation support apparatus 22 is caused to perform only a monitoring operation requested for a monitoring target path represented in the "target facility" and the "target operation" included in the operation control information WI-2. Accordingly, also the operation support system 2, similar to the operation support system 1 according to the first embodiment, supports a monitoring operation performed by each operator such that other operations are not performed for the monitoring target facility and the monitoring target path, and other operations are not performed for a facility and a path that are not monitoring targets, in other words, an incorrect monitoring operation is not performed. In addition, the operation support system 2 supports an operator for performing an operation of generating a report by generating the report in which a result of a monitoring operation represented in the "reporting items" included in the operation control information WI-2 and acquired information are arranged by using the operation support apparatus 22. Accordingly, in the operation support system 2, an operator can perform an appropriate monitoring operation for the monitoring target facility and the monitoring target path, and the manager can acquire and check the report in which a result of the desired monitoring operation is arranged.

In addition, in the operation support system 2, each of the operation control device 100 included in the operation support apparatus 21 and the operation control device 100 included in the operation support apparatus 22 controls a function executed by the operation execution apparatus 200 or the operation-monitoring apparatus 400 corresponding thereto for performing a monitoring operation in cooperation with each other although the input operation control information WI is different. Also in the operation support system 2, similar to the operation support system 1 according to the first embodiment, the constituent elements configuring the operation support system 2 may be configured as mutually different apparatuses. For this reason, in the operation support apparatus 21, the operation control device 100 and the operation execution apparatus 200 may be configured as mutually different apparatuses, and, in the operation support apparatus 22, the operation control device 100 and the operation-monitoring apparatus 400 may be configured as mutually different apparatuses. In such a case, the operation control device 100 corresponding to the operation support apparatus 21 and the operation control device 100 corresponding to the operation support apparatus 22 configured as mutually different apparatuses may be the same apparatus. In other words, one operation control device 100 corresponding to each of the operation execution apparatus 200 and the operation-monitoring apparatus 400 may be constituents in the operation support system 2. In such a case, the operation control device 100 (the function controller 140) corresponding to the operation execution apparatus 200 and the operation-monitoring apparatus 400, for example, transmits information representing a function to be operated to each of the operation execution apparatus 200 and the operation-monitoring apparatus 400 through a radio communication network built inside the plant. In addition, in a case in which the operation control device 100 is configured inside a cloud server apparatus included in a cloud computing system, the function controller 140 may be configured to transmit information representing a function to be operated to each of the operation execution apparatus 200 and the operation-monitoring apparatus 400 through the Internet.

Figure 6:
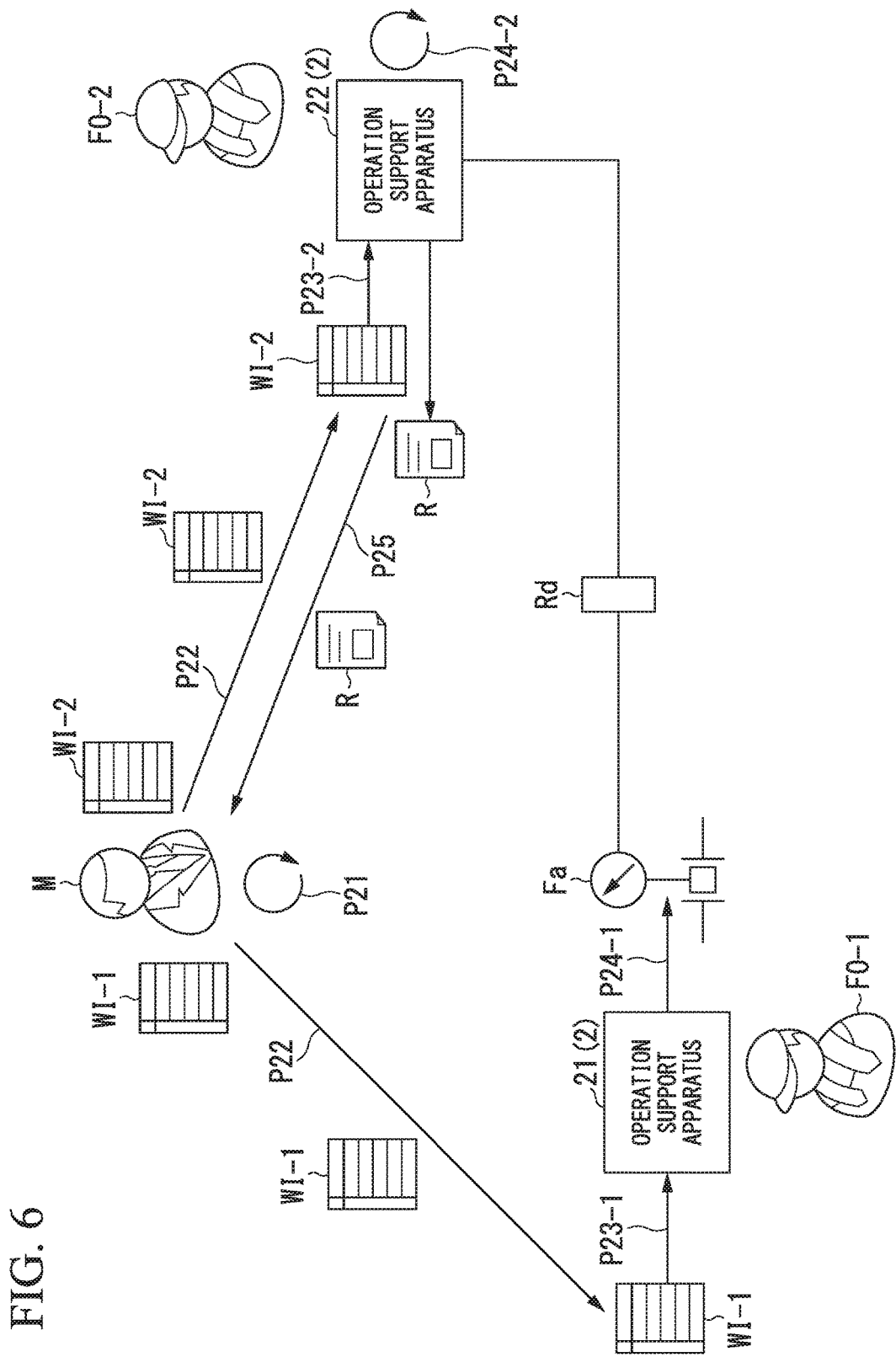
FIG. 6 is a diagram illustrating an example of the sequence of execution of an operation performed using the operation support system according to the second embodiment.

Next, the sequence of the monitoring operation performed in a plant into which the operation support system 2 according to the second embodiment is built will be described. In the description presented below, a case will be described in which the operation support apparatus 21 and the operation support apparatus 22 configuring the operation support system 2 perform a monitoring operation of a monitoring target path in cooperation with each other. FIG. 6 is a diagram illustrating an example of the sequence of execution of an operation performed using the operation support system 2 (the operation support apparatus 21 and the operation support apparatus 22) according to this second embodiment.

(Process P21): A manager M generates operation control information WI-1 and operation control information WI-2 used for requesting a maintenance operation (monitoring operation) of a monitoring target path through which a state according to the operation of a facility Fa arranged inside a plant is delivered for an operator FO-1 and an operator FO-2.

Here, an example of the operation control information WI-1 and the operation control information WI-2 generated by the manager M will be described. FIG. 7 is an example of operation control information WI used for requesting an operation in the operation support system 2 according to this second embodiment. FIG. 7 illustrates the operation control information WI-1 used for causing the facility Fa to perform an operation set in advance by using the operation support apparatus 21, and FIG. 7 also illustrates the operation control information WI-2 used for monitoring the state of the operation, which is set in advance, of the facility Fa by using the operation support apparatus 22.

First an example of the operation control information WI-1 illustrated in FIG. 7 will be described. The operation control information WI-1 includes information of "identification information (ID)", "operator", "target facility", "target operation", and "reporting items". More specifically, in the operation control information WI-1 illustrated in FIG. 7, as the information of the "identification information (ID)", "2100-1" assigned for identifying this operation control information WI-1 is included. In the operation control information WI-1 illustrated in FIG. 7, as the information of the "operator", "Operator A" that is a staff name of an operator FO-1 who visits the facility Fa and requests the execution of a monitoring operation is included. In addition, in the operation control information WI-1 illustrated in FIG. 7, as the information of the "target facility", "Tag: PT100 (model: EJX110)" representing that a facility Fa of which the assigned tag is "PT100" is an operation target facility is included. In the operation control information WI-1 illustrated in FIG. 7, as the information of the "target operation", "loop test" illustrating that a loop test is performed as a monitoring operation for a monitoring target path is included. Then, a pattern used for controlling the operation of the facility Fa that is that is an "output side" in the loop test is illustrated. More specifically, a "start signal" of a loop test is output by changing the output rate of the facility Fa in the order of "70(%)-30(%)-50(%)", and thereafter, a test pattern in which the output rate is changed in the order of "0(%)-50(%)-100(%)-50(%)-0(%)" at a "10 seconds interval" is illustrated as being output. Here, the "start signal" or the "test pattern" may be output as output values of the facility Fa instead of being represented as the output rate of the facility Fa as described above. In addition, in the operation control information WI-1 illustrated in FIG. 7, "None" representing that no report is generated is included as the information of the "reporting items". By using the information as described above, the operation control information WI-1 illustrated in FIG. 7 requests that the operation be controlled such that the output rate of the facility Fa to which Tag="PT100" is assigned is changed in patterns of the "start signal" and the "test pattern" when operator="Operator A" performs a monitoring operation of the "loop test".

Subsequently, an example of the operation control information WI-2 illustrated in FIG. 7 will be described. In the operation control information WI-2, information of "identification information (ID), an "operator", a "target facility", a "target operation", and a "reporting items" is included. More specifically, in the operation control information WI-2 illustrated in FIG. 7, as the information of the "identification information (ID)", "2100-2" that is assigned for identifying this operation control information WI-2 is included. According to the information of this "identification information (ID)", that the operation control information WI-2 represents that the operation control information WI-2 is linked with the operation control information WI-1 of which the "identification information (ID)" is "2100-1" is illustrated, in other words, the operation control information WI-1 and the operation control information WI-2 are in cooperation with each other (forming a set) as one operation. Here, the information of the "identification information (ID)" used for linking the operation control information WI-1 and the operation control information WI-2 with each other as one operation is not limited to the format of the information such as "2100-1" and "2100-2". For example, the operation control information WI-1 and the operation control information WI-2 may be in cooperation with each other by using a form of information having the same values of high-ranking digits such as "2100" and "2101". In addition, in the operation control information WI-2 illustrated in FIG. 7, as the information of the "operator", "Operator A" that is a staff name of an operator FO-2 who visits a location (for example, the location of a facility arranged at an end of the monitoring target path) set in advance for monitoring the operation of the facility Fa delivered through the monitoring target path and requests the execution of a monitoring operation is included. In addition, in the operation control information WI-2 illustrated in FIG. 7, as the information of the "target facility", "Tag: PT100 (model: EJX110)" representing the monitoring target path of the facility Fa of which the assigned tag is "PT100" is included. Furthermore, in the operation control information WI-2 illustrated in FIG. 7, as the information of the "target operation", "loop test" representing that a loop test is performed as a monitoring operation of the monitoring target path is included. Then, the pattern of the operation of the facility Fa at the time of performing a loop test, for example, measured by a measuring device, which is not illustrated in the drawing, that is the "reception side" in the loop test and a determination criterion used for determining a success/failure of a result of the measurement are represented. More specifically, in a case in which a measuring device, which is not illustrated in the drawing, measures changes in the output rate in order of "70(%)-30(%)-50(%)", a "start signal" representing the start of the loop test for the monitoring target path is detected, and thereafter, it is illustrated that a "test pattern" of which the output rate changes at a "10 seconds interval" in the order of "0(%)-50(%)-100(%)-50(%)-0(%)" is measured. In other words, in the operation control information WI-2, in a case in which the output rate delivered through the monitoring target path represents a "start signal", this represents that the output rate in which the "test pattern" is represented for 50 seconds after that is monitored. For the monitoring of the "start signal" or the "test pattern" using the measuring device that is not illustrated in the drawing, an output value rather than a change in the output rate as described above, may be monitored. In addition, it is illustrated that a result of a loop test is a success when an error in the output rate represented by a measurement value at the time of measuring the "test pattern" is within ±0.3(%). In the operation control information WI-2 illustrated in FIG. 7, as the information of the "reporting items", "determination result: success/failure" representing a result of the determination on the basis of the determination criterion and a "measurement value" and a "measurement value" that is the rate of each output in a test pattern are included. According to the information as described above, in the operation control information WI-2 illustrated in FIG. 7, it is requested that, when operator="Operator A" performs a monitoring operation of a "loop test", monitoring of the operation of a facility Fa to which Tag="PT100" is assigned at a location set in advance on the monitoring target path and reporting using a report including a result (success/failure) of the determination on the basis of the determination criterion and each measurement value in the test pattern are requested.

(Process P22): The manager M requests a monitoring operation for an operator FO-1 and an operator FO-2 by outputting the operation control information WI-1 and the operation control information WI-2 that have been generated. More specifically, the manager M requests the operator FO-1 to cause the facility Fa that is the "output side" in the loop test to output a "test pattern" by outputting the generated operation control information WI-1. In addition, the manager M requests the operator FO-2 to measure a "test pattern" delivered through a monitoring target path, for example, by using a measuring device, which is not illustrated in the drawing, that is the "reception side" in the loop test and report using a report by outputting the generated operation control information WI-2. As a method for the manager M to request a monitoring operation for the operator FO-1 and the operator FO-2, similar to the operation support system 1 according to the first embodiment, any one of various methods may be considered. In the operation control information WI-1 illustrated in FIG. 7 and the operation control information WI-2 illustrated in FIG. 7, information of an "operation information authentication method" and a "registration authentication method" is not included. For this reason, the manager M is considered to exchange the operation control information WI-1 and the operation control information WI-2 by using wired interfaces such as USBs (registered trademark) of the operation support apparatus 21 carried by the operator FO-1 and the operation support apparatus 22 carried by the operator FO-2. At this time, the manager M may designate (deliver) a time at which a monitoring operation is performed for each of the operator FO-1 and the operator FO-2. In addition, as described above, in the operation control information WI, an "operation start condition" may be included as a condition that is necessary when the operation is performed. For this reason, when the operation control information WI-1 and the operation control information WI-2 are generated in Process P21, by including information of the "operation start condition" in each of the operation control information WI-1 and the operation control information WI-2, the manager M may designate a date and time at which each of the operator FO-1 and the operator FO-2 performs a monitoring operation.

(Process P23-1): The operator FO-1 inputs the operation control information WI-1 to the operation support apparatus 21 in accordance with a request for a monitoring operation from the manager M. In this way, each constituent element of the operation support apparatus 21 performs the process described above, receives the input operation control information WI-1, and is in a state in which an operation function for performing the monitoring operation represented in the "target operation" is operated. More specifically, the operation control device 100 included in the operation support apparatus 21 receives and registers the input operation control information WI-1. Then, the operation control device 100 performs control of the operation execution apparatus 200 to operate a function that is necessary for performing a monitoring operation represented in the "target operation" included in the registered operation control information WI-1. The operation execution apparatus 200 executes the operation function for performing the monitoring operation represented in the "target operation" included in the registered operation control information WI-1 in accordance with the control from the operation control device 100 and stands by in a state in which the output rate of the facility Fa is changed in patterns represented in the "start signal" and the "test pattern" of the loop test.

At this time, the operation support apparatus 21, similar to the operation support apparatus 10 configured as the operation support system 1 according to the first embodiment, by displaying information included in the registered operation control information WI-1 on the display operation unit 210, presents a requesting details of the monitoring operation from the manager M represented in the operation control information WI-1 to the operator FO-1. In addition, in a case in which the "operation start condition" is included in the registered operation control information WI-1, the operation support apparatus 21 displays a condition represented in the "operation start condition" on the display operation unit 210 as well. Accordingly, the operator FO-1 can check a timing at which the monitoring operation for a certain facility arranged inside the plant is performed.

(Process P23-2): The operator FO-2 inputs operation control information WI-2 to the operation support apparatus 22 in accordance with a request for the monitoring operation from the manager M. Accordingly, the operation support apparatus 22 is in a state in which each constituent element performs the process described above, and a monitoring function for receiving the input operation control information WI-2 and performing the monitoring operation represented in the "target operation is operated. More specifically, the operation control device 100 included in the operation support apparatus 22 receives and registers input operation control information WI-2. Then, the operation control device 100 performs control of the operation-monitoring apparatus 400 to operate a function that is necessary for performing a monitoring operation represented in the "target operation" included in the registered operation control information WI-2. The operation-monitoring apparatus 400 executes a monitoring function used for performing the monitoring operation represented in the "target operation" included in the registered operation control information WI-2 in accordance with the control from the operation control device 100 and stands by in a state in which the "start signal" and the "test pattern" of a loop test delivered through a monitoring target path are monitored.

At this time, the operation support apparatus 22, similar to the operation support apparatus 10 configured as the operation support system 1 according to the first embodiment or the operation support apparatus 21, by displaying the information included in the registered operation control information WI-2 on the display operation unit 210, presents request details of the monitoring operation from the manager M, which is represented by the operation control information WI-2, to the operator FO-2. In addition, similar to the operation support apparatus 21, in a case in which the "operation start condition" is included in the registered operation control information WI-2, the operation support apparatus 22, by also displaying a condition represented in the "operation start condition" on the display operation unit 210, may allow the operator FO-2 to check a timing at which the monitoring operation for a certain facility arranged inside the plant is performed.

(Process P24-1): The operator FO-1 visits a facility Fa that is the requested monitoring target on the basis of the information of the facility displayed on the display operation unit 210 and connects the operation support apparatus 21 executing an operation function corresponding to the "target operation" included in the registered operation control information WI-1 to the facility Fa that is the monitoring target. Accordingly, the operation support apparatus 21 controls the operation of the facility Fa and changes the output rate in patterns of the "start signal" and the "test pattern" of the loop test represented in the "target operation" by using the executed operation function.

(Process P24-2): The operator FO-2, on the basis of the information of the facility displayed on the display operation unit 210, visits the place of a measuring device, which is not illustrated in the drawing, monitoring the operation state of the facility Fa in the requested monitoring operation on the basis of the information of the facility of the requested monitoring target path and connects the operation support apparatus 22 executing a monitoring function corresponding to the "target operation" included in the registered operation control information WI-2 to the measuring device not illustrated in the drawing. Accordingly, the operation support apparatus 22 acquires measurement values measured by the measuring device not illustrated in the drawing by using the executed monitoring function and determines a "start signal"

of the loop test represented in the "target operation" from the acquired measurement values. Then, after the determination of the "start signal", the operation support apparatus 22 acquires measurement values measured by the measuring device not illustrated in the drawing by using the executed monitoring function and monitors a "test pattern" of the loop test represented in the "target operation" from the acquired measurement values. At this time, the operation support apparatus 22 stores (writes) the measurement values acquired from the measuring device not illustrated in the drawing as the information of details to be reported in the storage device 300 as a result of the operation represented in the "reporting items" included in the registered operation control information WI-2. In addition, when the monitoring operation is performed, the operator FO-2 operates the operation support apparatus 22 according to operation instructions displayed on the display operation unit 210 as is necessary. In this way, the integrity of a path (a path from the facility Fa outputting a signal for the loop test to a location at which the signal for the loop test is monitored) from the facility Fa to the measuring device not illustrated in the drawing can be checked.

(Process P25): When the monitoring operation of the monitoring target path using the operation support apparatus 22 ends, the operator FO-2 disconnects the operation support apparatus 22 from the measuring device not illustrated in the drawing and, for example, returns to an office or the like. In addition, at this time, the operator FO-2 gives a notification of the end of the monitoring operation to the operator FO-1. Accordingly, the operator FO-1 disconnects the operation support apparatus 21 from the facility Fa and, for example, returns to an office or the like. The operation support apparatus 22 generates a report R in which a result of the monitoring of the monitoring target path in the performed monitoring operation on the basis of measurement values, which are acquired from the measuring device, not illustrated in the drawing, stored in the storage device 300. Then, the operator FO-2 presents the report R generated by the operation support apparatus 22 to the manager M, for example, at the office.

Here, an example of the report R generated by the operation support apparatus 22 will be described. FIG. 8 is a diagram illustrating an example of a report R used for reporting a result of an operation performed using the operation support system 2 according to this second embodiment. FIG. 8 illustrates an example of a report R used for reporting a result of an operation corresponding to the operation control information WI-2 illustrated in FIG. 7. More specifically, the report R is illustrated which is used for reporting a determination result (success/failure) and measurement values of the test pattern represented as the information of the "reporting items" in the operation control information WI-2 illustrated in FIG. 7. In the report R illustrated in FIG. 8, "PT100" represented as a tag of the facility Fa that is the operation target and "EJX110" represented as a model of the facility Fa that is the operation target in the "target facility" of the operation control information WI-2 illustrated in FIG. 7 are represented in the field of "facilities". In addition, in the report R illustrated in FIG. 8, a "loop test" represented as operation details in the "target operation" of the operation control information WI-2 illustrated in FIG. 7 is represented in the field of "operation". In the report R illustrated in FIG. 8, "date" and "time" at which the requested operation is performed for the monitoring target path are represented in the field of "operation date". In addition, in the report R illustrated in FIG. 8, "Operator A" represented as the staff name requesting the operation in the "operator" of the operation control information WI-2 illustrated in FIG. 7 is represented in the field of "staff". In the report R illustrated in FIG. 8, the field of "person in charge" is a blank. In the report R illustrated in FIG. 8, a determination result="success" represented as information that is needed to be reported in the "reporting items" of the operation control information WI-2 illustrated in FIG. 7 is illustrated in the field of "result", and a test pattern (%)="0 (%)-50(%)-100(%)-50(%)-0(%)" represented as the pattern of the operation of the facility Fa at the time of performing a loop test in the "target operation" and time interval="10 seconds interval" are respectively illustrated in the fields of "test pattern" and "output interval". In addition, in the report R illustrated in FIG. 8, each measurement value represented as information needed to be reported in the "reporting items" of the operation control information WI-2 illustrated in FIG. 7 is illustrated in a field corresponding to the rate of each output in the test pattern. More specifically, a measurement value="0 (kPa)" corresponding to a test pattern="0(%)", a measurement value="49.9 (kPa)" corresponding to a test pattern="50(%)", a measurement value="99.9 (kPa)" corresponding to a test pattern="100(%)", a measurement value="49.9 (kPa)" corresponding to a test pattern= "50(%)", and a measurement value="0 (kPa)" corresponding to a test pattern="0(%)" are illustrated in corresponding fields. According to the report R as illustrated in FIG. 8, the manager M can check that a determination result of the performed monitoring operation of the "loop test", which is requested for the operator="Operator A", for the monitoring target path of the facility Fa to which Tag="PT100" is assigned is a "success". In addition, the manager M can check an actual output value (measurement value) corresponding to a rate of the output causing the facility Fa to be operated in a test pattern at this time.

According to such a sequence, the operation support system 2, in a monitoring operation requested by the manager M, supports the operator FO-1 caused to visit the place of the facility Fa arranged inside the plant while carrying the operation support apparatus 21 and cause the facility Fa to perform an operation set in advance. More specifically, in the operation support system 2, the operation support apparatus 21 is caused to perform only a monitoring operation requested for a monitoring target facility represented in the "target facility" and the "target operation" included in the operation control information WI-1. In addition, the operation support system 2, in a monitoring operation requested by the manager M, supports the operator FO-2 who visits a location set in advance on a monitoring target path arranged inside the plant while carrying the operation support apparatus 22 and controls a measuring device not illustrated in the drawing for monitoring the operation state of the facility Fa. More specifically, in the operation support system 2, the operation support apparatus 22 is caused to perform only a monitoring operation requested for a monitoring target path represented in the "target facility" and the "target operation" included in the operation control information WI-2, and results of the monitoring of the monitoring target path represented in the "reporting items" included in the operation control information WI-2 are arranged as a report R. Accordingly, also in the operation support system 2, similar to the operation support system 1 according to the first embodiment, each of the operator FO-1 and the operator FO-2 can accurately perform the monitoring operation requested by the manager M. Accordingly, also in the operation support system 2, similar to the operation support system 1 according to the first embodiment, the operator FO-2 can accurately report a result desired to be reported by the manager M.

In the sequence of the monitoring operation performed in the plant into which the operation support system 2 described above is built, a case in which the determination result acquired by of the execution of the monitoring operation is a "success" has been described. However, a case in which the determination result acquired by the execution of the monitoring operation is a "failure" may be considered. Then, after submitting a report in which "failure" is indicated to the manager M, in order to identify a place causing the failure, the operator FO-2 receiving a request for performing a monitoring operation again at a different location set in advance on the monitoring target path from the manager M on the basis of new operation control information WI-2 (may be the same operation control information WI-2) may be conceived. In such a case, the operator FO-2, for example, visits the place of a relay apparatus Rd illustrated in FIG. 6 and performs a monitoring operation again by using the operation support apparatus 22, in other words, the operator FO-2 repeats Process P22, Process P23-2, Process P24-2, and Process P25. In addition, the new operation control information WI-2 of a case in which the determination result acquired by a performed monitoring operation is a "failure" may not be received at the time of receiving a request for performing the monitoring operation again from the manager M after the report R in which the "failure" is represented is submitted to the manager M but be received together with the operation control information WI-2 at an initial stage in which the monitoring operation is received. In other words, the manager M may generate operation control information WI in which a plurality of pieces of operation control information corresponding to the operation control information WI-1 and the operation control information WI-2 are linked as one operation, request a monitoring operation according to the operation control information WI-1 for the operator FO-1, and request a monitoring operation according to a plurality of pieces of operation control information corresponding to the operation control information WI-2 for the operator FO-2. In such a case, when a determination result of the performed monitoring operation is a "success", the operator FO-2 submits a report R generated by the operation support apparatus 22 in Process P25 to the manager M. On the other hand, when a determination result of the performed monitoring operation is a "failure", for example, the operator FO-2 directly visits the place of the relay apparatus Rd and performs the monitoring operation again without returning to the office or the like.

As described above, the operation support system 2 according to the second embodiment supports the operator FO-1 who visits the place of the facility Fa arranged inside the plant while carrying the operation support apparatus 21 configuring the operation support system 2 and performs a monitoring operation and the operator FO-2 who visits a location set in advance on the monitoring target path while carrying the operation support apparatus 22 configuring the operation support system 2 and monitors the monitoring target path not to perform incorrect operations. In this way, in the operation support system 2 according to the second embodiment, the operator FO-1 and the operator FO-2 can perform a monitoring operation for a facility that is a monitoring target and a monitoring target path in cooperation with each other.

In addition, the operation support system 2 according to the second embodiment supports the operator FO-2 generating a report R in which a result of a monitoring operation desired by the manager M is written on the basis of a result of the monitoring operation performed by the operation support apparatus 22 configured by the operation support system 2. Accordingly, in the operation support system 2 according to the second embodiment, the manager M can generate a report R in which a result of the monitoring operation desired by the manager M is written, and the manager M can acquire and check the report R in which the result of the desired monitoring operation is arranged.

In addition, in the operation support system 2 according to the second embodiment, although a case in which a loop test is performed in a plant has been described, also in a different operation in the plant, by applying reasoning similar to that in the operation support system 2 according to the second embodiment, an operation performed by a plurality of operation support apparatus in cooperation with each other can be performed, and similar effects can be acquired.

In the operation support system 2 according to the second embodiment, a case has been described in which the operator FO-1 carries the operation support apparatus 21 configuring the operation support system 2, the operator FO-2 carries the operation support apparatus 22, and a monitoring operation is performed with the operator FO-1 and the operator FO-2 in cooperation with each other, in other words, with the operation support apparatus 21 and the operation support apparatus 22 in cooperation with each other. However, a case may be considered in which the operation support apparatus 21 and the operation support apparatus 22 configuring the operation support system 2 are carried by one operator and are installed at respective locations to perform a monitoring operation. More specifically, it may be considered that, after the operator FO-1 connects the operation support apparatus 21 to a facility Fa that is a monitoring target Fa in Process P24-1 and performs control of the operation of the facility Fa to repeatedly change the output rate of a "start signal" and a "test pattern" of a loop test represented in the "target operation", the operator FO-1 moves to the place of a measuring device not illustrated in the drawing monitoring the operation state of the facility Fa in the requested monitoring operation and performs Process P24-1. Also in such a case, the operation support apparatus 21 and the operation support apparatus 22 can perform a monitoring operation by executing a corresponding function (an operation function or an identification function) in cooperation with each other.

In addition, in the operation support system 2 according to the second embodiment, a case has been described in which the operator FO-1 and the operator FO-2 perform a loop test of a monitoring target path in cooperation with each other. However, for example, three operators may monitor the operation of a facility Fa delivered through a monitoring target path in the same period also at the location of the relay apparatus Rd illustrated in FIG. 6 in cooperation with each other. In such a case, the manager M generates operation control information WI-2 (may be the same operation control information WI-2) similar to that illustrated in FIG. 7 for performing a monitoring operation of the monitoring target path at the location of the relay apparatus Rd and requests a monitoring operation at the location of the relay apparatus Rd for a third operator FO. Accordingly, the third operator FO visits the place of the relay apparatus Rd while carrying an operation support apparatus (may not include the storage device 300) similar to the operation support apparatus 22 carried by the operator FO-2 and performs a monitoring operation similar to the operator FO-2. Accordingly, the integrity of both a path from the facility Fa to the relay apparatus Rd and a path from the relay apparatus Rd to the measuring device not illustrated in the drawing can be checked, and a detailed path from the facility Fa to the measuring device not illustrated in the drawing can be checked.

As described above, according to an embodiment of the present invention, the operation control device is included in the operation support system. Then, in the embodiment of the present invention, operation control information indicating operation details for each one requested operation are represented is generated by the manager, and the generated operation control information is output to the operation control device, whereby the execution of the operation is requested for the operator. Accordingly, in the embodiment according to the present invention, contents of the operation to be performed for a facility that is an operation target can be accurately and efficiently delivered to an operator who actually performs the operation. In addition, in the embodiment according to the present invention, the operation control device performs control of the operation execution apparatus to operate only a function that is necessary for performing the operation on the basis of the input operation control information. In this way, in the embodiment according to the present invention, when an operator actually performs an operation, an operation performed for an incorrect facility other than a facility that is an operation target and an erroneous operation or an incorrect operation other than an operation to be performed using the operation execution apparatus, in other words, operation mistakes decrease in number, whereby the operation can be performed accurately and efficiently. In addition, in the embodiment according to the present invention, the operation control device generates a report in which a result of the operation performed by the operation execution apparatus on the basis of input operation control information is summarized. Accordingly, in the embodiment according to the present invention, when an operator generates a report relating to the actually-performed operation, there is less omission of information needed to be reported and reporting of incorrect information, in other words, a report that is more effective is generated, and the manager can acquire the report accurately and efficiently.

In this way, in the embodiment according to the present invention, the operation control device can support a request for an operation for an operator, execution of an operation to be performed by an operator, and reporting of a result of the performed operation on the basis of the operation control information. Accordingly, in the embodiment according to the present invention, a problem according to inadequate delivery of operation details, a problem occurring according to inadequate understanding of operation details, a problem occurring due to inadequate understanding of reporting details, and the like decrease, and an appropriate operation can be performed for a facility that is an operation target, and a report in which a result of an operation desired by the manager is arranged can be generated.

In addition, in the embodiment according to the present invention, a case in which the operation control information WI is in the form in which operation details for each one requested operation are arranged to be displayed has been described. In addition, in the second embodiment, a case in which monitoring operations are performed in cooperation with each other by using a set of the operation control information WI-1 and the operation control information WI-2 has been described. However, the form of the operation control information WI is not limited to the form represented in each embodiment. In addition, the linking of the operation control information WI is not limited to a combination corresponding to operations to be performed in cooperation with each other. For example, the operation control information WI may be in a form having a hierarchy. More specifically, information of the "target facility" and information of the "target operation" included in the operation control information WI may be hierarchized, and a form may be employed in which the operation control information WI in which the "target facility" representing a facility that is an operation target is included is set as main operation control information, the operation control information WI in which the "target operation" representing the operation to be performed for a facility represented in the "target facility" is included is set as sub operation control information, and a plurality of pieces of sub operation control information is linked with one piece of main operation control information. In the case of this form, the "target facility" representing a facility that is the operation target does not need to be included in each sub operation control information, and the manager M can generate the operation control information WI more efficiently. The operation control device to which the operation control information WI of this form is input can perform control of the operation execution apparatus to sequentially operate functions that are necessary for performing an operation represented in the "target operation" of the linked sub operation control information for a facility that is an operation target represented in the "target facility" of the main operation control information.

In a case in which the operation control information WI is in the form having a hierarchy, the hierarchy is not limited to the form described above in which a plurality of pieces of sub operation control information in which the "target operation" described above is included is linked with one piece of main operation control information. For example, the details of an operation performed for a facility that is an operation target represented in the "target operation" may be represented using another writing method. More specifically, a form may be employed in which the degree of skill (skill level) of the operator is divided into a plurality of stages (levels), each operation control information WI in which the "target operation" indicating operation details to be performed for a facility that is an operation target for each stage is included may be set as sub operation control information, and a plurality of pieces of sub operation control information are linked with one piece of main operation control information. In such a case, the operation control device to which the operation control information WI of this form is input selects sub operation control information matching the degree of skill of the operator from the information of the operator authenticated on the basis of the information of the "operation information authentication method" or the "registration authentication method" and may perform control of the operation execution apparatus to display contents of the operation represented in the "target operation" of the selected sub operation control information on the display operation unit 210. Accordingly, an operator whose degree of skill is high (skilled), for example, can accurately perform an operation by understanding the operation by only checking operation items displayed on the display operation unit 210. On the other hand, an operator whose degree of skill is low, for example, can accurately perform an operation by performing the operation while checking the sequence of the operation to be performed, precautions, and the like displayed on the display operation unit 210. In other words, an accurate operation can be performed for a facility that is an operation target regardless of the degree of skill of an operator.

In addition, in the embodiment according to the present invention, a case in which the operation execution apparatus 200 or the operation-monitoring apparatus 400 is controlled to operate a function (an operation function or a monitoring function) that is necessary for performing an operation represented in the "target operation" included in the operation control information WI for a facility that is an operation target has been described. However, as described above, considering the degree of skill of an operator, there are cases where, when an operation requested by the manager M is performed, in a case in which a defect of the facility is found, an operator whose degree of skill is high (skilled) can immediately perform a treatment corresponding to the found defect. At this time, when a function operating in the operation execution apparatus 200 or the operation-monitoring apparatus 400 is only a function that is necessary for performing the operation represented in the "target operation", a case may be considered in which even a skilled operator cannot perform a treatment corresponding to the found defect by using only the operating function. For this reason, in the operation control information WI, when an operation represented in the "target operation" is performed, information representing whether or not the function of the operation execution apparatus 200 or the operation-monitoring apparatus 400 to be operated is limited may be included. For example, as described above, in a case in which the operation control information WI is in the form for selecting sub operation control information matching the degree of skill of the operator, "no function limited" or "function partly limited" may be set in sub operation control information matching a skilled operator, and "function limited" may be set in sub operation control information matching an operator whose degree of skill is low. More specifically, in the example of the operation control information WI illustrated in FIG. 3, in a case in which the function is limited to only a function that is necessary for performing the operation, the information of the "target operation" may be set as "zero-point adjustment (function limited)", and, in a case in which the function is not limited to a function necessary for performing the operation, but a part of the other function is limited, the information of the "target operation" may be set as "zero-point adjustment (a part of functions limited)". In addition, in the example of the operation control information WI illustrated FIG. 3, in a case in which no function is limited, the information of the "target operation" may be set as "zero-point adjustment (no limited function)". Accordingly, for example, in a case in which a skilled operator finds a defect of the facility when the operation of the "zero-point adjustment" represented in the "target operation" of the operation control information WI is performed, the operator can immediately perform a treatment corresponding to the found defect within a range of unlimited functions in the case of "zero-point adjustment (function partly limited)" or by appropriately using all the functions in the case of "zero-point adjustment (no function limited)". In such a case, information representing the execution of the treatment corresponding to the found defect or information representing the details of the performed treatment may be included in the report R. In addition, in an operation of the "zero-point adjustment" corresponding to the "zero-point adjustment (limited function)" represented in the "target operation" of the operation control information WI, the operation described in the embodiment according to the embodiment is performed.

Furthermore, in the embodiment according to the present invention, a case in which the "zero-point adjustment" is performed as an example of the maintenance operation performed for a facility arranged inside the plant has been described. However, in the plant, the maintenance operation performed for the facility is not limited to "zero-point adjustment". As maintenance operations in the plant, for example, there are a "start-up operation" for newly arranging and operating a facility inside the plant, a "facility replacement operation" for responding to a malfunction occurring after operating the facility or the like, and the like in addition to the "zero-point adjustment". In addition, the operation support system is not limited to being used only for a maintenance operation in the plant.

Furthermore, in the embodiment according to the present invention, while the data format of the operation control information WI is not described, as the operation control information WI, all the information or a part of the information included in the operation control information WI may be in the form of being encrypted according to a method set in advance. In such a case, the operation control device 100 is configured to operate on the basis of the information included in the operation control information WI after decrypting the encryption of the input operation control information WI.

In the embodiment according to the present invention, a case in which the operation support system is a system supporting an operation performed for each facility arranged inside the plant has been described. However, the operation support system according to the present invention is not limited to being used in a plant. For example, the idea for the operation support system according to the present invention may be applied to a maintenance system used for maintenance of facilities of a building, maintenance of gas, water, electricity, and the like of a house, or maintenance of a tunnel or a bridge.

Then, for example, by recording a program used for realizing the process performed by each constituent element configuring the operation support system according to this embodiment such as each constituent element included in the operation control device 100 or the operation execution apparatus 200 inside the operation support apparatus 10 configured as the operation support system 1 illustrated in FIG. 1 on a computer-readable storage medium and causing the computer system to read and execute the program recorded on this storage medium, the above-described various processes relating to the operation support system according to this embodiment may be performed. The "computer system" described here may include an OS and hardware such as peripherals. In a case in which a WWW system is used, the "computer system" is assumed to include a home page-providing environment (or display environment). The "computer-readable storage medium" represents a storage device such as a writable non-volatile storage device (300) including a flexible disk, a magneto-optical disk, a ROM, and a flash storage device (300), a portable medium such as a CD-ROM, or a hard disk or the like built into a computer system.

Furthermore, the "computer-readable storage medium" includes a medium storing a program for a fixed time such as a volatile storage device (300) (for example, a dynamic random-access storage device (300) (DRAM)) disposed inside a computer system that becomes a server or a client in a case in which a program is transmitted through a network such as the Internet or a communication line such as a telephone line. The program described above may be transmitted from a computer system storing this program in a storage device or the like to another computer system through a transmission medium or a transmission wave in a transmission medium. Here, the "transmission medium"

transmitting a program represents a medium having an information transmitting function such as a network (communication network) including the Internet and the like or a communication circuit line (communication line) including a telephone line. The program described above may be used for realizing a part of the functions described above. In addition, the program described above may be a program realizing the functions described above by being combined with a program recorded in the computer system in advance, a so-called a differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An operation support apparatus for supporting an operation to be performed for each facility of a plant, the operation support apparatus comprising:
   an operation control device configured to control a target operation to be performed for a target facility on the basis at least in part of an operation control information which comprises information of the target facility and a target operation information related to the target operation, wherein information of the target facility indicates a facility that is a target of an operation and the target operation information indicates contents of the operation to be performed for the target facility; and
   an operation execution apparatus which has an operation function of controlling an operation of the target facility,
   wherein the operation control device comprises:
      an operation information input unit configured to receive input of the operation control information; and
      a function controller configured to output information representing a function to be operated to the operation execution apparatus based on the information of the target facility and the target operation information comprised in the operation control information received by the operation information input unit, and
   wherein the operation execution apparatus comprises:
      a function execution unit configured to execute the operation function in accordance with the information representing the function to be operated, which has been output from the function controller, the function execution unit being configured to output to the facility a control signal for controlling the facility.

2. The operation support apparatus according to claim 1, wherein the operation control device is configured to perform the operation function to be used for performing the target operation for the target facility.

3. The operation support apparatus according to claim 2, wherein the operation control device is configured to selectively perform only the operation functions that are necessary for performing the target operation for the target facility.

4. The operation support apparatus according to claim 2, wherein the operation control information further includes a reporting item representing details reported as results of the performed operation, and wherein the operation control device is configured to perform the operation function to be used for acquiring information of operation results represented in the reporting item, and to collectively output information of the results on the basis of the reporting item, the information of the results having been acquired by controlling an operation of the target facility and using the operation execution apparatus.

5. The operation support apparatus according to claim 2, wherein the operation execution apparatus has an operation function for performing a maintenance operation for the target facility installed.

6. The operation support apparatus according to claim 2, wherein the operation execution apparatus has an operation function for performing a monitoring operation for monitoring an operational state of the target facility installed.

7. The operation support apparatus according to claim 2, further comprising:
   an operation information authentication device configured to perform authentication at a time of receiving the operation control information in accordance with an authentication method on the basis of the information of an operation information authentication method included in the operation control information.

8. The operation support apparatus according to claim 7, further comprising:
   an operation authentication device configured to perform authentication at a time of performing an operation represented in target operation in accordance with an authentication method on the basis of the information of a registration authentication method included in the operation control information from the operation information authentication device.

9. The operation support apparatus according to claim 8, wherein
   the function controller is configured to control the operation of the function included in the operation execution apparatus for the execution of the operation represented in the target operation for a facility as an operation target represented in the target facility on the basis of the information of the target facility and the target operation included in the operation control information from the operation authentication device.

10. The operation support apparatus according to claim 9, wherein
    the function controller is configured to cause the operation execution apparatus to perform a function on the basis of the information of report items in a case that the information of the report items is included in the operation control information from the operation authentication device, and configured to control the operation of the function included in the operation execution apparatus for acquiring information of a result of the execution of the operation represented in the target operation for a facility.

11. The operation support apparatus according to claim 9, wherein
    the function controller is configured to perform control of the operation execution apparatus to operate a function for performing the operation represented in the target operation at a timing at which a condition represented in operation start conditions are satisfied, in a case that the operation start conditions are included in the operation control information from the operation authentication device.

12. The operation support apparatus according to claim 9, further comprising:

a storage device that stores the operation control information in association with a respective operation to be performed for a facility represented by the target facility; and wherein the function controller is configured to read, from the storage device the operation control information in association with the respective operation.

13. The operation support apparatus according to claim 1, wherein the operation control information is associated with a respective operation to be performed for a facility represented by the target facility.

14. An operation support system for supporting an operation to be performed for each facility of a plant, the operation support system comprising:

an operation control apparatus configured to control a target operation to be performed for a target facility on the basis at least in part of an operation control information which comprises information of the target facility and a target operation information related to the target operation, wherein information of the target facility indicates a facility that is a target of an operation and the target operation information indicates contents of the operation to be performed for the target facility; and an operation execution apparatus which has an operation function of controlling an operation of the target facility, wherein the operation control device comprises:
an operation information input unit configured to receive input of the operation control information; and a function controller configured to output information representing a function to be operated to the operation execution apparatus based on the information of the target facility and the target operation information comprised in the operation control information received by the operation information input unit, and wherein the operation execution apparatus comprises:
a function execution unit configured to execute the operation function in accordance with the information representing the function to be operated, which has been output from the function controller, the function execution unit being configured to output to the facility a control signal for controlling the facility.

15. The operation support system according to claim 14, wherein the operation control device is configured to perform the operation function of the operation execution apparatus having the operation function to be used when the target operation is performed for the target facility on the basis of each of plural sets of operation control information associated with a respective operation.

16. The operation support system according to claim 14, wherein the operation control device is configured to perform the operation functions of the operation execution apparatuses corresponding to the target facility, to perform the target operations for the target facility in cooperation with each other on the basis of each set of the operation control information associated with a respective operation.

17. The operation support system according to claim 14, wherein the operation control information is associated with a respective operation to be performed for a facility represented by the target facility.

18. An operation support method that supports an operation performed for each facility of a plant, the operation support method comprising:

controlling a target operation to be performed for a target facility on the basis at least in part of an operation control information which comprises information of the target facility and a target operation information related to the target operation, wherein information of the target facility indicates a facility that is a target of an operation and the target operation information indicates contents of the operation to be performed for the target facility;

receiving input of the operation control information;

outputting information representing a function to be operated based on the information of the target facility and the target operation information comprised in the operation control information;

executing the operation function in accordance with the information representing the function to be operated; and outputting to the facility a control signal for controlling the facility.

19. A non-transitory computer readable storage medium that stores a software program including computer-executable instructions, when executed by one or more computers, to cause the one or more computers to perform an operation support method that supports an operation performed for each facility of a plant, the operation support method comprising:

controlling a target operation to be performed for a target facility on the basis at least in part of an operation control information which comprises information of the target facility and a target operation information related to the target operation, wherein information of the target facility indicates a facility that is a target of an operation and the target operation information indicates contents of the operation to be performed for the target facility;

receiving input of the operation control information;

outputting information representing a function to be operated based on the information of the target facility and the target operation information comprised in the operation control information;

executing the operation function in accordance with the information representing the function to be operated; and outputting to the facility a control signal for controlling the facility.

* * * * *